United States Patent
Kosugi et al.

(10) Patent No.: US 10,834,461 B1
(45) Date of Patent: Nov. 10, 2020

(54) ELECTRONIC APPARATUS, CONTROL METHOD, AND PROGRAM

(71) Applicant: LENOVO (SINGAPORE) PTE. LTD., Singapore (SG)

(72) Inventors: Kazuhiro Kosugi, Yokohama (JP); Masashi Nishio, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 16/506,080

(22) Filed: Jul. 9, 2019

(30) Foreign Application Priority Data

Apr. 22, 2019 (JP) .................. 2019-081236

(51) Int. Cl.
| | |
|---|---|
| *H04H 60/33* | (2008.01) |
| *H04N 5/63* | (2006.01) |
| *H04N 21/443* | (2011.01) |
| *H04N 21/258* | (2011.01) |
| *H04N 21/6587* | (2011.01) |
| *H04N 21/422* | (2011.01) |

(52) U.S. Cl.
CPC ........ *H04N 21/4436* (2013.01); *H04H 60/33* (2013.01); *H04N 21/25875* (2013.01); *H04N 21/42201* (2013.01); *H04N 21/6587* (2013.01)

(58) Field of Classification Search
CPC ................. H04N 5/63; H04N 21/4436; H04N 21/25875; H04N 21/42201; H04N 21/6587; H04H 60/33

USPC ........................ 725/10, 11, 12; 348/730, 725
See application file for complete search history.

(56) References Cited

U.S. PATENT DOCUMENTS

| | | | | |
|---|---|---|---|---|
| 7,730,507 | B2* | 6/2010 | Sakai .................. | H04N 5/4401 348/730 |
| 8,752,122 | B2* | 6/2014 | Iwahashi .................. | H04N 5/63 348/730 |
| 10,009,769 | B2* | 6/2018 | Watanabe .............. | H04W 4/80 |

FOREIGN PATENT DOCUMENTS

JP     2016-148895 A     8/2016

* cited by examiner

*Primary Examiner* — Trang U Tran
(74) *Attorney, Agent, or Firm* — Shimokaji IP

(57) ABSTRACT

An electronic apparatus includes: a system processing unit configured to execute system processing based on a system; a person detection unit configured to detect a change from a first detection state in which a person is present within a predetermined detection range to a second detection state in which no person is present; an operation control unit configured to instruct the system processing unit to cause the operating state of the system to make a transition to a first operating state when the change from the first detection state to the second detection state is detected by the person detection unit; and a prohibition control unit configured to instruct the operation control unit to prohibit the transition to the first operating state when the change from the first detection state to the second detection state is detected by the person detection unit.

6 Claims, 12 Drawing Sheets

ELECTRONIC APPARATUS, CONTROL METHOD, AND PROGRAM

FIELD OF THE INVENTION

The present invention relates to an electronic apparatus, a control method, and a program.

BACKGROUND OF THE INVENTION

There is an electronic apparatus which makes a transition to a usable state when a person approaches and to a standby state in which functions except some of the functions are stopped when the person leaves (for example, Japanese Unexamined Patent Application Publication No. 2016-148895).

SUMMARY OF THE INVENTION

However, if the transition to the standby state is forcibly made when the person leaves, processing may be interrupted against the intention of a user depending on the processing running on the electronic apparatus. Further, depending on the processing running on the electronic apparatus, the processing may have priority so that the transition to the standby state cannot be made, or even when the transition to the standby state is made, the processing may be executed continuously or intermittently depending on the standby state.

The present invention has been made in view of the above circumstances, and it is an object thereof to provide an electronic apparatus, a control method, and a program for controlling an operating state properly according to the presence or absence of a person.

The present invention has been made to solve the above problem, and an electronic apparatus according to the first aspect of the present invention includes: a system processing unit configured to execute system processing based on a system; a person detection unit configured to detect a change from a first detection state in which a person is present within a predetermined detection range to a second detection state in which no person is present; an operation control unit configured to instruct the system processing unit to cause an operating state of the system to make a transition to a first operating state in which at least part of the system processing is limited when the change from the first detection state to the second detection state is detected by the person detection unit; and a prohibition control unit configured to instruct the operation control unit to prohibit the transition to the first operating state when the change from the first detection state to the second detection state is detected by the person detection unit, and to cancel prohibition on the transition to the first operating state based on a processing state of specific processing executed in the system processing.

The above electronic apparatus may also include: a playback processing unit configured to execute video playback processing as the specific processing executed in the system processing; and a playback control unit configured to instruct the playback processing unit to stop playback of a video when the change from the first detection state to the second detection state is detected by the person detection unit and an instruction to prohibit the transition to the first operating state is given by the prohibition control unit, wherein the prohibition control unit may cancel the prohibition on the transition to the first operating state under such a condition that the playback of the video is in a stopped state as a processing state of the video playback processing by the playback processing unit.

In the above electronic apparatus, when the change from the first detection state to the second detection state is detected by the person detection unit, the prohibition control unit may instruct the operation control unit to prohibit the transition to the first operating state in such a case where the specific processing is in a first processing state, and cancel the prohibition on the transition to the first operating state under such a condition that the specific processing is changed from the first processing state to a second processing state.

In the above electronic apparatus, when the change from the first detection state to the second detection state is detected by the person detection unit, the operation control unit may perform control to make at least part of a display image to be displayed on a display unit invisible, and after that, when the prohibition on the transition to the first operating state is canceled by the prohibition control unit, the operation control unit may instruct the system processing unit to make the transition to the first operating state.

Further, according to the second aspect of the present invention, there is provided a control method for an electronic apparatus including a system processing unit configured to execute system processing based on a system, the control method including: a person detection step of causing a person detection unit to detect a change from a first detection state in which a person is present within a predetermined detection range to a second detection state in which no person is present; an operation control step of causing an operation control unit to instruct the system processing unit to cause an operating state of the system to make a transition to a first operating state in which at least part of the system processing is limited when the change from the first detection state to the second detection state is detected in the person detection step; and a prohibition control step of causing a prohibition control unit to instruct the operation control unit to prohibit the transition to the first operating state when the change from the first detection state to the second detection state is detected by the person detection unit, and to cancel prohibition on the transition to the first operating state based on a processing state of specific processing executed in the system processing.

Further, according to the third aspect of the present invention, there is provided a program for a computer as an electronic apparatus including a system processing unit configured to execute system processing based on a system, the program causing the computer to execute: a person detection step of detecting a change from a first detection state in which a person is present within a predetermined detection range to a second detection state in which no person is present; an operation control step of instructing the system processing unit to cause an operating state of the system to make a transition to a first operating state in which at least part of the system processing is limited when the change from the first detection state to the second detection state is detected in the person detection step; and a prohibition control step of giving an instruction to prohibit the transition to the first operating state when the change from the first detection state to the second detection state is detected in the person detection step, and canceling prohibition on the transition to the first operating state based on a processing state of specific processing executed in the system processing.

The above-described aspects of the present invention can control the operating state of the electronic apparatus properly according to the presence or absence of a person.

DETAILED DESCRIPTION OF THE INVENTION

Embodiments of the present invention will be described below with reference to the accompanying drawings.

First Embodiment

[Outline]

First, the outline of an electronic apparatus 1 according to a first embodiment will be described. The electronic apparatus 1 according to the embodiment is, for example, a laptop PC (Personal Computer). Note that the electronic apparatus 1 may be any other type of electronic apparatus, such as a desktop PC, a tablet terminal, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state includes a state in which at least the display of the display unit appears to be OFF (screen OFF) or a screen lock state. The screen lock is a state where an image preset to make a processed content invisible (for example, an image for a screen lock) is displayed on the display unit to indicate that the system is unusable until the lock is released (for example, user authentication is performed). For example, the standby state may be the standby state or a sleep state, or a state corresponding to modern standby in Windows (registered trademark) or S3 state (sleep state) defined in the ACPI specification. For example, the standby state is an operating state lower in power consumption than the normal operating state.

In the following, a transition of the system operating state from the standby state to the normal operating state may also be called "boot." In the standby state, since the activation level is generally lower than the normal operating state, the boot of the system of the electronic apparatus 1 leads to the activation of the operation of the system in the electronic apparatus 1.

Figure 1A:
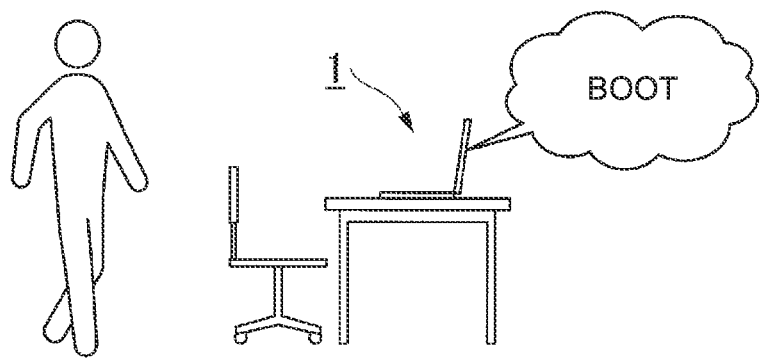
FIGS. 1A-C are diagrams for describing an outline of HPD processing of an electronic apparatus according to a first embodiment.
Figure 1B:
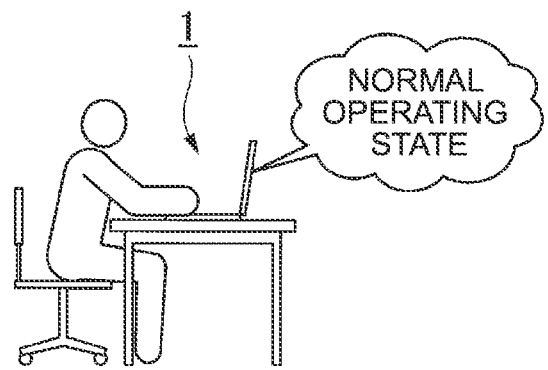
Figure 1C:
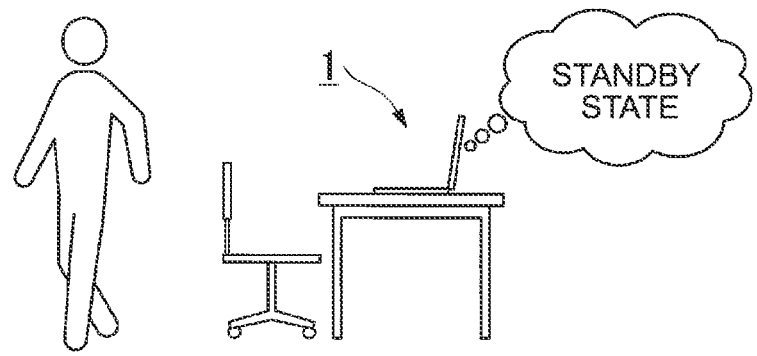

FIGS. 1A-C are diagrams for describing an outline of HPD processing of the electronic apparatus 1 according to the embodiment. The electronic apparatus 1 includes a proximity sensor to be described later to detect a person present in the neighborhood of the electronic apparatus 1. This processing for detecting the presence of a person may also be called HPD (Human Presence Detection) processing. The electronic apparatus 1 detects a person present in the neighborhood of the electronic apparatus 1 to control the operating state of the system of the electronic apparatus 1 based on the detection result. For example, as illustrated in FIG. 1A, when detecting that a person approaches the electronic apparatus 1, the electronic apparatus 1 automatically boots the system to make a transition to the normal operating state. Further, as illustrated in FIG. 1B, in a state where the person is present in front of the electronic apparatus 1 (Presence), the electronic apparatus 1 causes the system to be limited so as not to make a transition to the standby state and to continue the normal operating state. Then, as illustrated in FIG. 1C, when detecting that the person leaves the electronic apparatus 1, the electronic apparatus 1 causes the system to make a transition to the standby state.

By the HPD processing, the electronic apparatus 1 also controls playback of a video operating in the system processing as well as control of the operating state of the system. For example, when leaving of the person is detected during playback of the video, the electronic apparatus 1 stops the video being played back and causes the system to make a transition to the standby state. Stopping the video means stopping the playback of the video and remaining the video at the playback position (i.e., pausing the video (Pause)). After that, when the approach of the person is detected, the electronic apparatus 1 causes the system to make a transition from the standby state to the normal operating state, and then starts playback of the paused video.

Here, a certain time lag from the time when the person actually left the electronic apparatus 1 to the time when the electronic apparatus 1 detects leaving of the person may occur (for example, about 40 seconds at the maximum). In this case, even when the video being played back is stopped in response to the fact that leaving of the person is detected, playback of the video is continued during this time lag even though the user does not watch the video. Therefore, if the video is played back from the paused position at the next playback of the video, the user will watch a part of the video moved forward by a length of time corresponding to the time lag, rather than the continued part of the video watched by the user at the last time. Therefore, when the user approaches again after leaving during playback of the video, the electronic apparatus 1 starts playback of the video after rewinding the video to a playback position as a timing at which it is estimated that the user left. For example, the electronic apparatus 1 starts playback of the video after rewinding the video by a length of time corresponding to a part played back due to the time lag in detecting the leaving of the person.

When the electronic apparatus 1 detects the leaving of the person, a certain time lag (for example, about 2 to 10 seconds) also occurs from the boot of the system until authentication processing (for example, login processing) is completed (until the user can watch playback of the video). Although the user cannot watch playback of the video during this time lag, the electronic apparatus 1 may start the playback of the video in the background before the completion of the login processing. Therefore, the electronic apparatus 1 may start the playback of the video after further rewinding the video by a length of time corresponding to a part played back due to the time lag in this login processing.

Thus, when the user comes back after leaving during playback of the video, the electronic apparatus 1 can start playback from a playback position (a playback position as a timing at which it is estimated that the user left) rewound by a length of time corresponding to a part of the video played back despite that the user was not able to watch the part due to the time lag (for example, about 40 seconds at the maximum) in detecting the leaving of the person and the time lag (for example, about 2 to 10 seconds) from the time when the approach of the person is detected until the login processing is completed.

Figure 2:
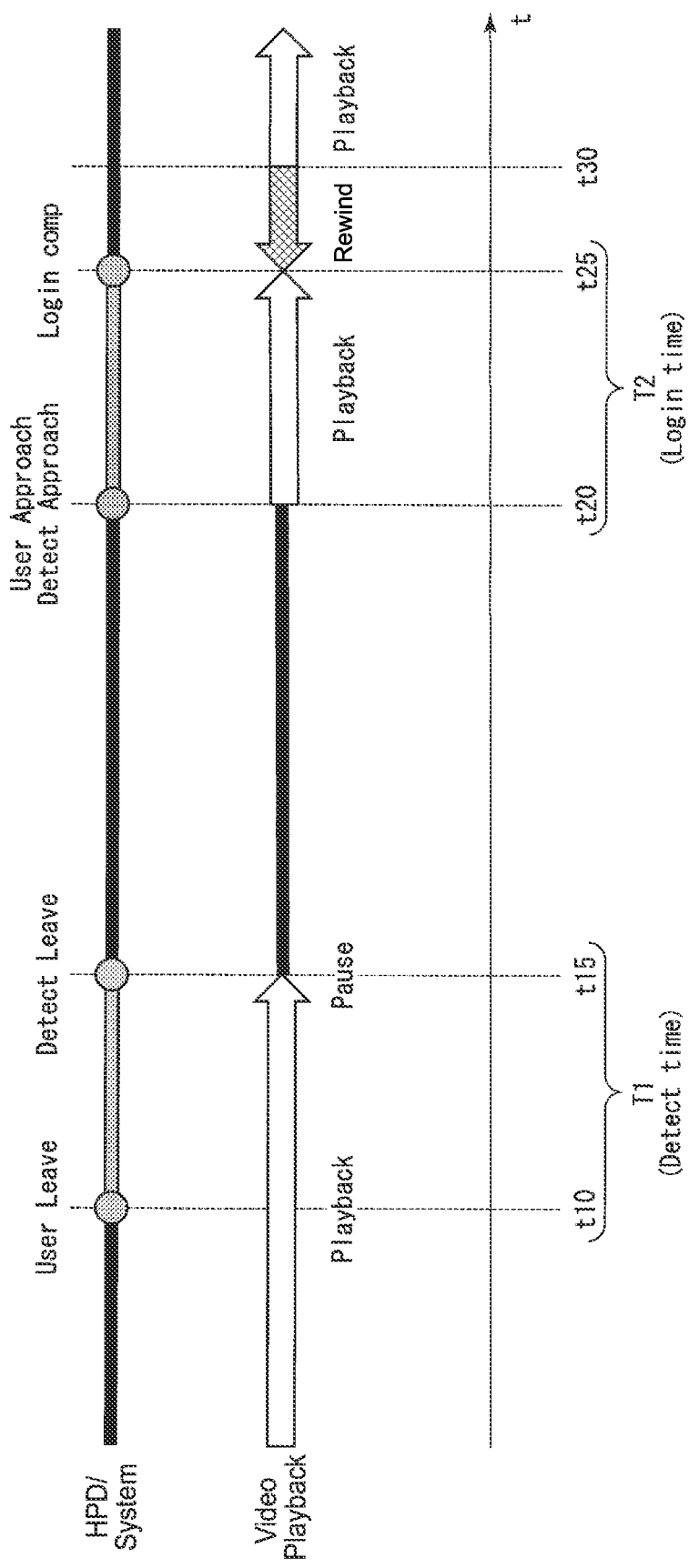
FIG. 2 is a chart illustrating an outline of playback control according to the embodiment.

FIG. 2 is a chart illustrating an outline of playback control according to the embodiment. In FIG. 2, the abscissa is time t to illustrate an example of video playback control by the HPD processing. The video is, for example, a streaming video played back in an application program running on an OS (Operating System) of the electronic apparatus 1, a video stored in the form of a file such as MP4, or the like. At time t10, when the user leaves the electronic apparatus 1 (User Leave), the electronic apparatus 1 detects leaving of a person (user) (Detect Leave) based on the output of the proximity sensor. For example, suppose that the electronic apparatus 1 takes detection time T1 (Detect time) from time t10 to time t15 to detect leaving. In this case, the transition of the system to the standby state is made after the playback of the video is paused (Pause) at time t15. Thus, despite that the user does not watch the video after time t10 at which the user left the electronic apparatus 1, the electronic apparatus 1 makes the transition to the standby state after the playback of the video (Playback) is continued up to time t15. In other words, the playback of the video moves forward by detection time T1 after the user no longer watches the video.

Further, suppose that the user approaches the electronic apparatus 1 (User Approach) and the electronic apparatus 1 detects the approach of a person (user) (Detect Approach) at time t20. In this case, the electronic apparatus 1 boots the system from the standby state in response to detecting the approach of the person (user) and executes login processing. In this instance, the application program in which the video was played back before the transition to the standby state may start the playback of the video in conjunction with the boot of the system. During a period up to login processing time T2 (Login time) from time t20, at which the approach of the person (user) is detected, to time t25 at which the login processing is completed (Login comp), the playback of a part of the video that the user cannot watch moves forward. Therefore, in response to the completion of the login processing, the electronic apparatus 1 starts the playback of the video at time t30 after rewinding the video by a length of playback time of a part of the video played back during the detection time T1 and by a length of playback time of another part of the video played back during the login processing time T2 (Rewind). In other words, in response to the completion of the login processing, the electronic apparatus 1 starts the playback of the video from a playback position as a timing at which it is estimated that the user left. Note that the time taken to rewind the video (from time t25 to time t30) varies with the length of video parts to be rewound and the rewind speed (the speed of rewinding the video in the application program). Thus, the user can watch the video continuously from the playback position at which the user had watched the video before left without any particular operation when the user comes back after once leaving during the playback of the video. Note that the electronic apparatus 1 may play back the video after rewinding the video by further adding, as a margin, a predetermined time to the sum of the detection time T1 and the login processing time T2.

Next, the structure/configuration of the electronic apparatus 1 according to the embodiment will be described in detail.

[External Structure of Electronic apparatus]

Figure 3:
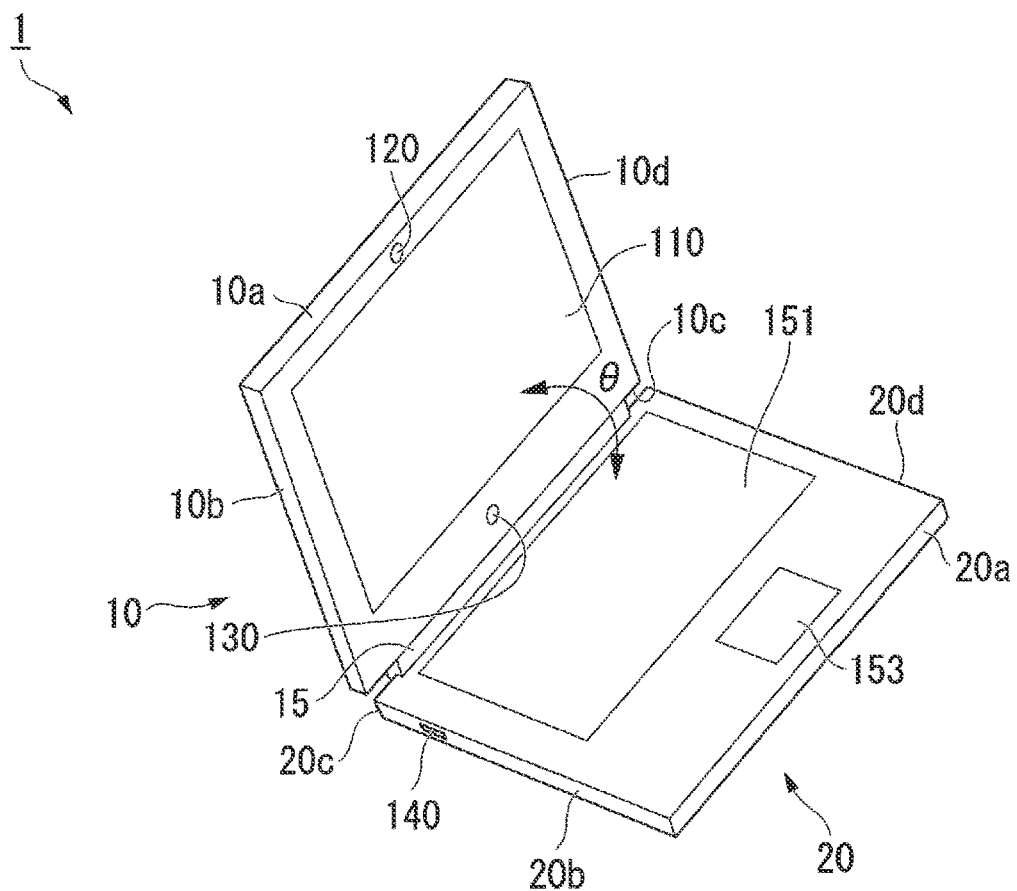
FIG. 3 is a perspective view illustrating an external structure example of the electronic apparatus according to the first embodiment.

FIG. 3 is a perspective view illustrating an external structure example of the electronic apparatus 1 according to the embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In the figure, the direction from the side face 20a to the side face 20c is referred to as "back," and the direction from the side face 20c to the side face 20a is referred to as "front." The right hand and left hand in the backward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open is referred to as an "open state."

The external appearance of the electronic apparatus 1 in FIG. 3 illustrates an example of the open state. The open state is a state where the side face 10a of the first chassis 10 and the side face 20a of the second chassis 20 are separated. In the open state, the inner faces of the first chassis 10 and the second chassis 20 appear so that the electronic apparatus 1 will be expected to be able to carry out normal operation. The open state is a state where the open angle θ between the inner face of the first chassis 10 and the inner face of the second chassis 20 is equal to or more than a predetermined angle, typically about 100 to 130°. The range of open angles θ to be open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 and a proximity sensor 130 are provided in a peripheral area of the display unit 110 on the inner face of the first chassis 10. The imaging unit 120 is arranged on the side of the side face 20a in the peripheral area of the display unit 110. The proximity sensor 130 is arranged on the side of the side face 20c in the peripheral area of the display unit 110.

In the open state, the imaging unit 120 captures an image of an object within a predetermined angle of view in a direction (front) to face the inner face of the first chassis 10. The predetermined angle of view is an imaging angle of view defined by an imaging element included in the imaging unit 120 and an optical lens provided in front of an imaging surface of the imaging element.

The proximity sensor 130 detects an object (for example, a person) present in the neighborhood of the electronic apparatus 1. For example, the proximity sensor 130 is an infrared distance sensor configured to include a light-emitting part for emitting infrared light and a light-receiving part for receiving reflected light which is the infrared light returned after being emitted and reflected on the surface of the object. The proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light or a ToF (Time of Flight) method for converting, to a distance, a time difference from light-emitting to light-receiving, or the like.

Figure 4:
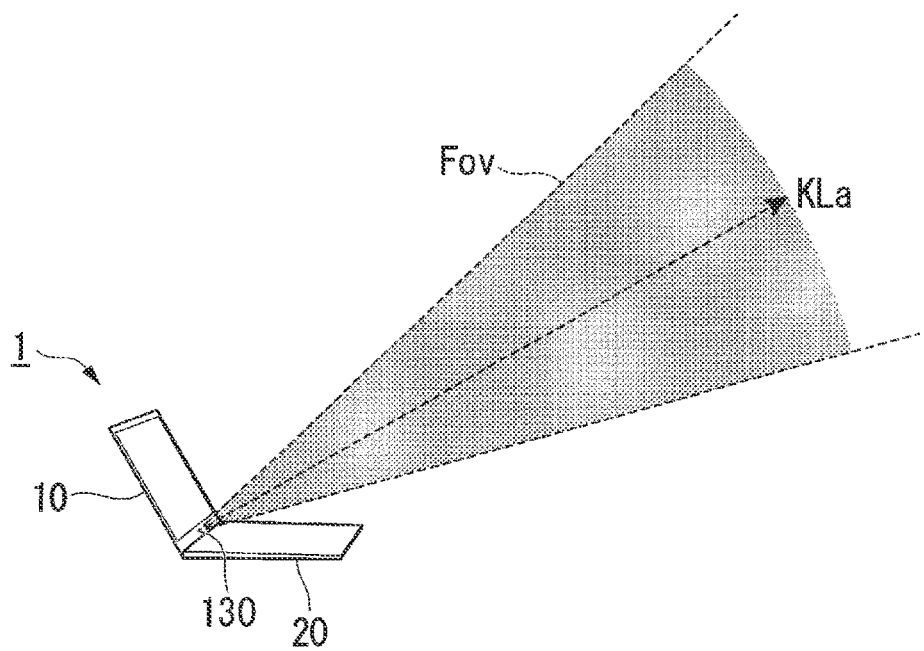
FIG. 4 is a schematic diagram illustrating a sensor detection range of a proximity sensor.

FIG. 4 is a schematic diagram illustrating a sensor detection range of the proximity sensor 130. In the open state, the proximity sensor 130 arranged on the inner face of the first chassis 10 detects an object (for example, a person) in a direction (front) to face the inner face of the first chassis 10. A detection field of view FoV indicates an angle detectable by the proximity sensor 130. A detection limit distance KLa indicates a limit distance detectable by the proximity sensor 130. A range defined by the detection field of view FoV (for example, 25° to 30°) and the detection limit distance KLa (for example, 120 cm) is the sensor detection range detectable by the proximity sensor 130.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and it may be a sensor using any other method, such as an ultrasonic sensor or a sensor using an UWB (Ultra Wide Band) radar, as long as the sensor detects a distance to the object.

Returning to FIG. 3, a power button 140 is provided on the side face 20b of the second chassis 20. The power button 140 is an operating element used by the user to give instructions of booting the system (making a transition from the standby state to the normal operating state) and making a transition from the normal operating state to the standby state. Further, a keyboard 151 and a touch pad 153 are provided as an input device on the inner face of the second chassis 20. Note that a touch sensor may be included as the input device instead of or in addition to the keyboard 151 and the touch pad 153, and a mouse and an external keyboard may also be connected. When the touch sensor is provided, an area corresponding to the display surface of the display unit 110 may be configured as a touch panel for accepting operations. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling their functions. In the state where the first chassis 10 and the second chassis 20 are completely closed, the open angle θ is 0'.

[Configuration of Electronic Apparatus]

Figure 5:
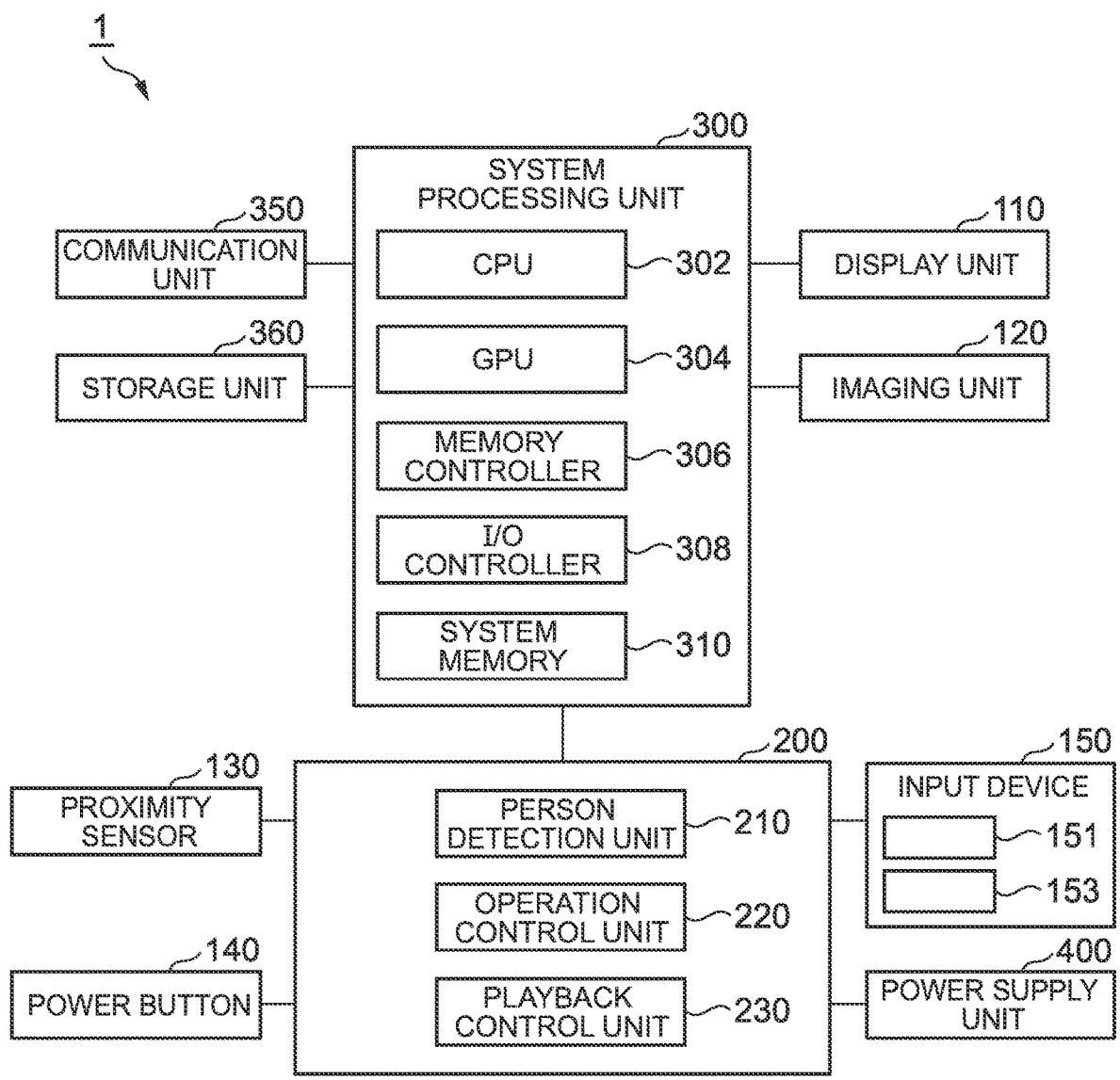
FIG. 5 is a schematic block diagram illustrating a configuration example of the electronic apparatus according to the first embodiment.

FIG. 5 is a schematic block diagram illustrating a configuration example of the electronic apparatus 1 according to the embodiment. The electronic apparatus 1 is configured to include the display unit 110, the imaging unit 120, the proximity sensor 130, the power button 140, an input device 150, an EC (Embedded Controller) 200, a system processing unit 300, a communication unit 350, a storage unit 360, and a power supply unit 400. The display unit 110 displays display data (images) generated based on system processing executed by the system processing unit 300, processing of an application program running in the system processing, and the like.

The imaging unit 120 captures an image of an object within a predetermined angle of view in a direction (front) to face the inner face of the first chassis 10, and outputs the captured image to the system processing unit 300. For example, when the face of a person approaching the electronic apparatus 1 is contained within the angle of view of the imaging unit 120, the imaging unit 120 captures a face image of the person, and outputs the captured face image to the system processing unit 300. The imaging unit 120 may be an infrared camera or a normal camera. The infrared camera is a camera including an infrared sensor as an imaging element. The normal camera is a camera including, as an imaging element, a visible light sensor for receiving visible light.

The proximity sensor 130 detects an object (for example, a person) present in a direction (front) to face the inner face of the first chassis 10, and outputs, to the EC 200, a detection signal indicative of the detection result. The power button 140 outputs, to the EC 200, operation signals according to user's operations.

The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit. The power supply unit 400 includes a DC (Direct Current)/DC converter. The DC/DC converter converts, the voltage of DC power, supplied from an AC (Alternate Current)/DC adapter or a battery pack, to voltage requested for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program prestored in the ROM thereof and executes the read control program to fulfill the function. The EC 200 operates independently of the system processing unit 300 to control the operation of the system processing unit 300 and manage the operating state of the system processing unit 300. The EC 200 is connected to the proximity sensor 130, the input device 150, and the power supply unit 400.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the input device 150, and outputs, to the system processing unit 300, an operation signal related to processing of the system processing unit 300 among the acquired operation signals. Further, the EC 200 acquires a detection signal indicative of the detection result from the proximity sensor 130 to execute the HPD processing based on the detection result. For example, as a functional configuration related to the HPD processing, the EC 200 includes a person detection unit 210, an operation control unit 220, and a playback control unit 230.

Based on the detection signal acquired from the proximity sensor 130, the person detection unit 210 detects a person (more specifically, an object estimated to be a person) present within a predetermined detection range. For example, based on the detection signal acquired from the proximity sensor 130, the person detection unit 210 detects a distance to the person present within the predetermined detection range in front of the electronic apparatus 1. The predetermined detection range is a range preset to detect a person in front of the electronic apparatus 1, which is referred to as a person detection range below. This person detection range is a range defined by the detection angle of view indicative of the angle of view as a detection target and the maximum detection distance indicative of the distance as a detection target. For example, the person detection range corresponds to the sensor detection range of the proximity sensor 130. Specifically, for example, the detection angle of view in the person detection range corresponds to the detection angle of view FoV (see FIG. 4) of the proximity sensor 130. Further, for example, the maximum detection distance in the person detection range corresponds to the detection limit distance KLa of the proximity sensor 130 (see FIG. 4). Note that the person detection range may be such that a limitation on the maximum detection distance or the minimum detection distance is set as part of the sensor detection range of the proximity sensor 130. In other words, the person detection unit 210 may also detect the person (distance to the person) by setting a preset range in the sensor detection range of the proximity sensor 130 as the person detection range.

For example, when acquiring a detection signal according to the distance to the person acquired from the proximity sensor 130, the person detection unit 210 detects that the person is present within the person detection range and detects the distance to the person. On the other hand, when the detection signal according to the distance to the person cannot be acquired from the proximity sensor 130, the person detection unit 210 detects that no person is present within the person detection range.

Further, when detecting a person after no person is detected within the person detection range, the person detection unit 210 determines that the person approaches the front of the electronic apparatus 1 and detects the approach of the person to the electronic apparatus 1. Further, when continuing to detect a person after detecting the person within the person detection range, the person detection unit 210 determines that the person is present in front of the electronic apparatus 1. Further, when no longer detecting the person after the person is detected within the person detection range, the person detection unit 210 determines that the person present in front of the electronic apparatus 1 has left and detects leaving of the person from the electronic apparatus 1.

Here, the detection signal according to the distance to the person acquired from the proximity sensor 130 will be acquired even if the detection target is any object other than the person. When the object present within the person detection range is no longer detected or when an object absent within the person detection range is detected, the object is a moving object and can be roughly estimated as the person from the situation. On the other hand, when the electronic apparatus 1 is used in a small room, a box seat, or the like, a wall or the back of a chair may be present at a short distance (within the person detection range) even when the user leaves the electronic apparatus 1. In this case, since the person detection unit 210 continues to detect the presence of an object such as the wall or the back of the chair within the person detection range, there is a concern that leaving of the user cannot be detected correctly. Therefore, the person detection unit 210 uses motion of the breast with breathing of a person to detect whether the person is present within the detection range or not.

For example, the person detection unit 210 determines whether an object present within the person detection range is the person or an object other than the person by determining whether there are minute distance variations caused by the breathing of the person based on the distance to the object detected by the proximity sensor 130.

Figure 6:
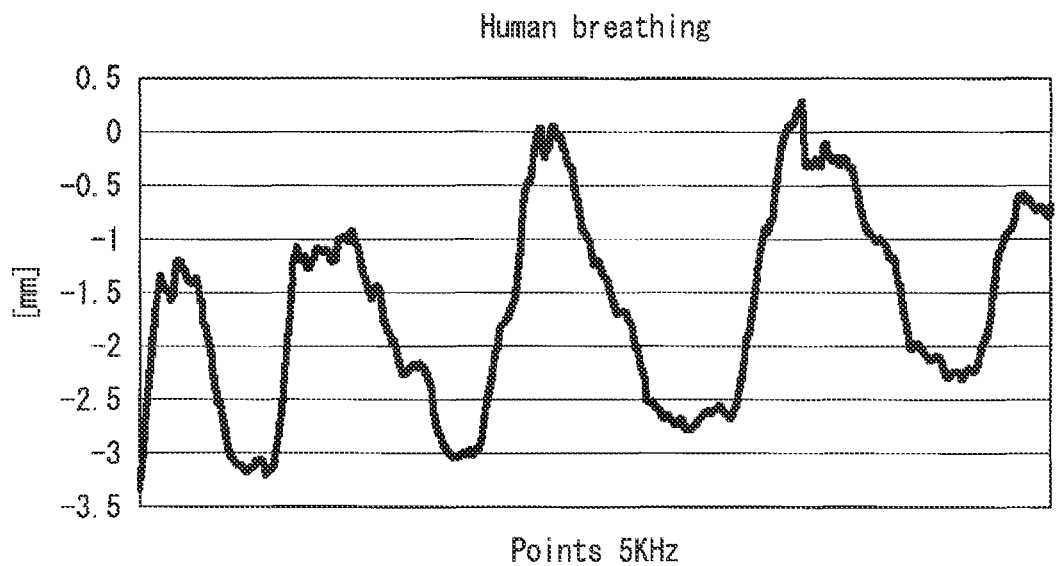
FIG. 6 is a graph illustrating an example of distance variations associated with the breathing of a person.

FIG. 6 is a graph illustrating an example of distance variations associated with the breathing (Human breathing) of a person. FIG. 6 illustrates an example of the results of measuring the distance to the breast of an opposed person with a sampling frequency of 5 kHz. Since the breast moves as the lungs repeat the cycles of expansion and contraction due to the breathing of the person, a minute variation of about several millimeters occurs in the distance to the breast according to the cycle of breathing. Based on the detection signal acquired from the proximity sensor 130, the person detection unit 210 detects the presence or absence of a minute distance variation of about several millimeters generated according to the cycle of breathing of a person. When the object present in front of the electronic apparatus 1 is a person (opposed person), a minute distance variation generated according to the cycle of breathing of this person is detected, while when the object present in front of the electronic apparatus 1 is any object other than the person (for example, the wall, the back of a chair, or the like), this minute distance variation is not detected. When this minute distance variation is detected, the person detection unit 210 determines that the object is the person, while when this minute distance variation is not detected, the person detection unit 210 determines that the object is any object other than the person. For example, the person detection unit 210 detects a change from a state where the person is present within the person detection range (Presence) to a state where the person is absent (that is, where the person has left (Leave)) based on the presence or absence of the minute distance variation mentioned above.

Figure 7:
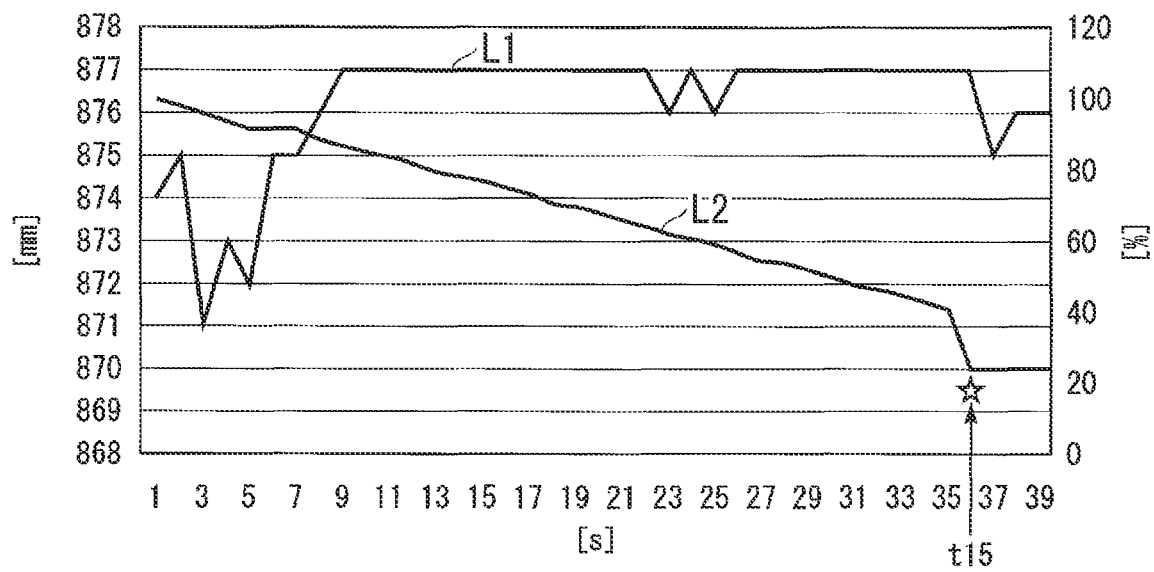
FIG. 7 is a graph illustrating an algorithm for detecting leaving of the person.

FIG. 7 is a graph illustrating an algorithm for detecting leaving of a person. In FIG. 7, the line indicated by reference numeral L1 illustrates detection distance (mm) detected by the proximity sensor 130. The line indicated by reference numeral L2 illustrates the human occupancy probability (HOP) (%) of a person. The distance variation caused by the breathing of a person is minute. Therefore, when the minute distance variation is no longer detected after the presence of the person is being detected (for example, from a state where the human occupancy probability of the person is 100%), the person detection unit 210 starts subtraction from a preset value (budget), and detects that the person has left (Leave) at a time point (time t15) at which the human occupancy probability is decreased up to a predetermined value. It may take about 40 seconds at the maximum (detection time T1 in FIG. 2) as described above from the start of subtraction from this preset value (budget) until leaving of the person is detected (leaving of the person is determined). Note that the time t15 illustrated in FIG. 7 corresponds to the time t15 illustrated in FIG. 2. Thus, the person detection unit 210 spends the detection time T1 (see FIG. 2) in detecting the change from the state where the person is present within the person detection range (Presence) to the state where the person is absent (that is, the person has left (Leave)).

Returning to FIG. 5, when the person is detected within the person detection range by the person detection unit 210 in the standby state, the operation control unit 220 boots the system in the standby state. Specifically, when the person detection unit 210 detects a person after no person is detected within the person detection range (that is, when approach of the person to the electronic apparatus 1 is detected), the operation control unit 220 instructs the system processing unit 300 to boot the system. More specifically, when booting the system, the operation control unit 220 outputs a control signal to the power supply unit 400 to supply power necessary for the operation of each unit of the electronic apparatus 1. After that, the operation control unit 220 outputs a boot signal to the system processing unit 300 to instruct the system processing unit 300 to boot the system. When acquiring the booth signal, the system processing unit 300 boots the system to make a transition from the standby state to the normal operating state.

Further, when the person detection unit 210 continues to detect the person within the person detection range, the operation control unit 220 restricts the system not to make a transition to the standby state by the system processing unit 300 so as to continue the normal operating state. However, even when the person detection unit 210 continues to detect a person within the person detection range, the operation control unit 220 may make a transition from the normal operating state to the standby state depending on a predetermined condition (for example, when the duration of non-operation lasts for a preset period of time and when no video is not being played back).

Further, when the person detection unit 210 no longer detects the person within the person detection range after the person is detected (that is, when the person detection unit 210 detects leaving of the person from the electronic apparatus 1), the operation control unit 220 instructs the system processing unit 300 to cause the system to make a transition from the normal operating state to the standby state. More specifically, the operation control unit 220 outputs a standby signal to instruct the system processing unit 300 to cause the system to make a transition from the normal operating state to the standby state. When acquiring the standby signal, the system processing unit 300 causes the system to make the transition from the normal operating state to the standby state. After that, the operation control unit 220 outputs, to the power supply unit 400, a control signal to stop the supply of power unnecessary in the standby state.

In addition to the HPD processing, the operation control unit 220 controls the operating state of the system based on an operation on the power button 140, and an operation to the input device 150 for selection from an operation control menu (logout (sign-out), sleep, shutdown, restart, or the like) prepared by the OS. For example, the operation control unit 220 acquires an operation signal from the power button 140, and instructs the system processing unit 300 to cause the operating state of the system to make a transition to the normal operating state or the standby state based on the acquired operation signal. For example, in the standby state, when acquiring an operation signal indicating that the power button 140 is held down, the operation control unit 220 outputs, to the system processing unit 300, a control signal (boot signal) for booting the system. Further, in the normal operating state, when acquiring the operation signal indicating that the power button 140 is held down, the operation control unit 220 outputs, to the system processing unit 300, a control signal to cause the operating state of the system to make a transition from the normal operating state to the standby state. More specifically, for example, when acquiring an operation signal indicating that the power button 140 is held down for a time shorter than a predetermined time in the normal operating state, the operation control unit 220 may output a control signal to cause the operating state of the system to make a transition to a sleep state, while when acquiring an operation signal indicating that the power button 140 is held down for a time longer than the predetermined time (long-press operation), the operation control unit 220 may output a control signal to cause the operating state of the system to make a transition to a shutdown state.

The playback control unit 230 controls video playback processing executed by the system processing unit 300. For example, when a video is being played back at the first timing of the detection time T1 (see FIG. 2) at which the person detection unit 210 detects leaving of the person, the playback control unit 230 instructs the system processing unit 300 to stop the video being played back at the last timing of this detection time T1 (that is, at the timing at which leaving of the person is detected). Specifically, the playback control unit 230 transmits, to the system processing unit 300, a "stop command" to give an instruction to stop the playback of the video. Further, based on the detection status by the person detection unit 210, the playback control unit 230 measures the detection time T1 using a timer (leaving detection timer).

Further, when the approach of the person is detected by the person detection unit 210, the playback control unit 230 uses a timer (login processing timer) to measure the login processing time T2 (see FIG. 2) from when the approach of the person is detected until completion of the login processing. Then, according to the timing when the login processing is completed, the playback control unit 230 instructs the system processing unit 300 to start (resume) the playback of the video with reference to the playback position at the first timing of the detection time T1 (see FIG. 2). For example, the playback control unit 230 instructs the system processing unit 300 to start the playback of the video with reference to the playback position obtained by rewinding the video by a length of time played back during the detection time T1 and the login processing time T2 (that is, the playback position at the first timing of the detection time T1). Specifically, after transmitting, to the system processing unit 300, a "rewind command" to give an instruction to cause the playback position to go back according to the timing when the login processing is completed, the playback control unit 230 transmits, to the system processing unit 300, a "playback command" to give an instruction to start playback at the timing when a length of time necessary to rewind the video by a length of time played back during the detection time T1 and the login processing time T2 has passed. When transmitting the "rewind command" and the "playback command," the playback control unit 230 may transmit the "rewind command" and the "playback command" after transmitting the "stop command."

Further, the playback control unit 230 may instruct the system processing unit 300 to start the playback of the video from a playback position further rewound by a predetermined length of time (for example, ten seconds, one minute, or the like) from the playback position obtained by rewinding the video by a length of time played back during the detection time T1 and the login processing time T2 (that is, the playback position at the first timing of the detection time T1).

The system processing unit 300 is configured to include a CPU (Central Processing Unit) 302, a GPU (Graphic Processing Unit) 304, a memory controller 306, an I/O (Input-Output) controller 308, a system memory 310, and an authentication processing unit 321, where processes of various application programs are executable on an OS (Operating System) by system processing based on the OS. Note that the CPU 302 and the GPU 304 may be collectively called a processor.

The CPU 302 executes processes by the OS and processes by an application program(s) running on the OS. Further, the CPU 302 makes a transition of the operating state of the system by the HPD processing performed by the EC 200 based on the detection result of the proximity sensor 130. For example, when the operating state is the standby state and the boot signal is input from the EC 200, the CPU 302 executes boot processing for making a transition from the standby state to the normal operating state. For example, in the case where the operating state is the sleep state, a hibernation state, or a power-off state, when power is supplied from the power supply unit 400 and the boot signal is input from the EC 200, the CPU 302 starts boot processing.

In the boot processing, the CPU 302 detects and initializes the minimum devices such as the system memory 310 and the storage unit 360 (pre-boot). The CPU 302 loads system firmware from the storage unit 360 into the system memory 310 to detect and initialize the other devices such as the communication unit 350 and the display unit 110 (post-processing). Initialization includes processing such as initial parameter settings. In a transition (resume) from the sleep state to the normal operating state, part of the post-processing may be omitted. After completion of the boot processing, the CPU 302 starts execution of the system processing based on the OS (boot). For example, when the operating state is the standby state and the boot signal is input from the EC 200, the CPU 302 resumes execution of an application program(s) the execution of which has been stopped.

In the boot processing, the CPU 302 executes login processing to determine whether to allow access to the OS. When the boot processing by the OS is started, the CPU 302 executes the login processing before allowing access to the OS, and the transition to the normal operating state is paused until login is allowed in the login processing. In the login processing, user authentication processing is performed to determine whether the person using the electronic apparatus 1 is a preregistered, authorized user or not. As the authentication, there are password authentication, face authentication, fingerprint authentication, and the like. In the embodiment, an example of using face authentication processing will be described. Specifically, the description will be made later with reference to FIG. 8.

In addition to making the transition of the operating state by the HPD processing described above, the CPU 302 also makes a transition of the operating state as OS processing. For example, when the duration of non-operation lasts for a preset period of time in the normal operating state, the CPU 302 makes a transition from the normal operating state to the standby state by the OS processing. The preset period of time is a threshold value for determining the transition to the standby state when the duration of non-operation has lasted, which is settable in the OS system settings. For example, when the duration of non-operation has lasted, there are options such as "screen OFF time" to determine a transition to a state where the display of the display unit 110 is turned OFF (screen OFF), "sleep time" to determine a transition to the sleep state, and the like, and the user can select and set an option arbitrarily from among these options. In addition to time options (for example, "one minute," "two minutes," "four minutes," "ten minutes," "half-hour," "one hour," . . . ), a setting of prohibiting the transition to screen OFF or a setting of prohibiting the transition to the sleep state (for example, "none"), and the like are included.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be allocated between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

The communication unit 350 is connected to other devices communicably through a wireless or wired communication network to send and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

Next, the login processing executed by the system processing unit 300 and a functional configuration of playback processing will be described.

Figure 8:
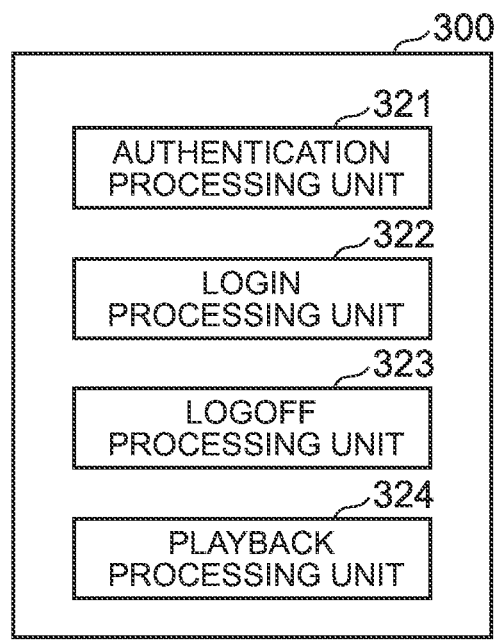
FIG. 8 is a schematic block diagram illustrating a functional configuration example of a system processing unit according to the first embodiment.

FIG. 8 is a block diagram illustrating an example of the functional configuration of the system processing unit 300 according to the embodiment. As an example of a configuration related to the login processing in the functional configuration executed by the CPU 302, the system processing unit 300 includes an authentication processing unit 321, a login processing unit 322, and a logoff processing unit 323. Further, as an example of a configuration related to the video playback processing in the functional configuration executed by the CPU 302, the system processing unit 300 includes a playback processing unit 324.

The authentication processing unit 321 executes face authentication processing based on a captured image output from the imaging unit 120. The face authentication processing includes face detection processing and face matching processing. The face detection processing is processing for defining a face area as an area of a face image from image data of the captured image output from the imaging unit 120. The face image is an image of the face of a person present in front of the electronic apparatus 1. Note that depth information acquired by the imaging unit 120 may be used in the authentication processing unit for face detection processing. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in to the account. The authentication information includes image feature values of the face image of the user. The authentication information is stored in further association with user information indicating the user. The user information may be information capable of identifying the user of the electronic apparatus 1, such as a user name, a user ID (Identifier), or the like.

As a result of matching the face image of the person captured by the imaging unit 120 with the authentication information on the set user, when it can be determined to match with each other, the authentication processing unit 321 determines that the face authentication is successful. On the other hand, for example, when a person other than the person using the electronic apparatus 1 cuts across in front of the electronic apparatus 1 by chance, the authentication processing unit 321 detects no face area from the image captured by the imaging unit 120. The authentication processing unit 321 outputs, to the login processing unit 322, the authentication result indicative of success/failure of the face authentication.

The login processing unit 322 executes login processing to log in (allow the user to access the OS) based on the authentication result by the authentication processing unit. Specifically, in the boot processing, the login processing unit 322 instructs the authentication processing unit 321 to execute the face authentication processing before allowing access to the OS, and pauses the subsequent boot processing. When the authentication result by the authentication processing unit 321 is successful, the login processing unit 322 allows the login, and resumes the execution of the paused boot processing. On the other hand, when the authentication result by the authentication processing unit 321 is unsuccessful, the login processing unit 322 outputs a notification of not allowing the login and leaves the execution of the boot processing paused.

The logoff processing unit 323 executes logoff processing to log off from the login state. For example, when receiving a logoff instruction (an instruction to make a transition to the standby state) with a user's operation, by the OS processing, by the HPD processing, or the like, the logoff processing unit 323 executes the logoff processing.

The playback processing unit 324 is a function implemented by executing a video playback application program running on the OS, which plays back a streaming video or a video stored in the form of a file such as MP4. Images of the video played back are displayed on the display unit 110. For example, when the system is in the normal operating state, the playback processing unit 324 acquires, from the EC 200, an operation signal indicative of an operation in response to a user's operation to any one of operation buttons corresponding to functions, such as "playback," "stop (pause)," "rewind," and "fast forward," displayed on the display unit 110 based on the application program to execute "playback," "stop (pause)," "rewind," or "fast forward" corresponding to the operation signal. Further, when the system makes a transition from the normal operating state to the standby state or a transition from the standby state to the normal operating state, the playback processing unit 324 executes the playback, stop, rewind, or the like of the video according to the "playback command," the "stop command," the "rewind command," or the like acquired from the playback control unit 230 of the EC 200.

[Operation of Operating State Control Processing by HPD Processing]

Next, the operation of operating state control processing for controlling the operating state of the system by the HPD processing will be described. First, the operation of boot processing to boot the system when the EC 200 detects the approach of a person to the electronic apparatus 1 will be described.

Figure 9:
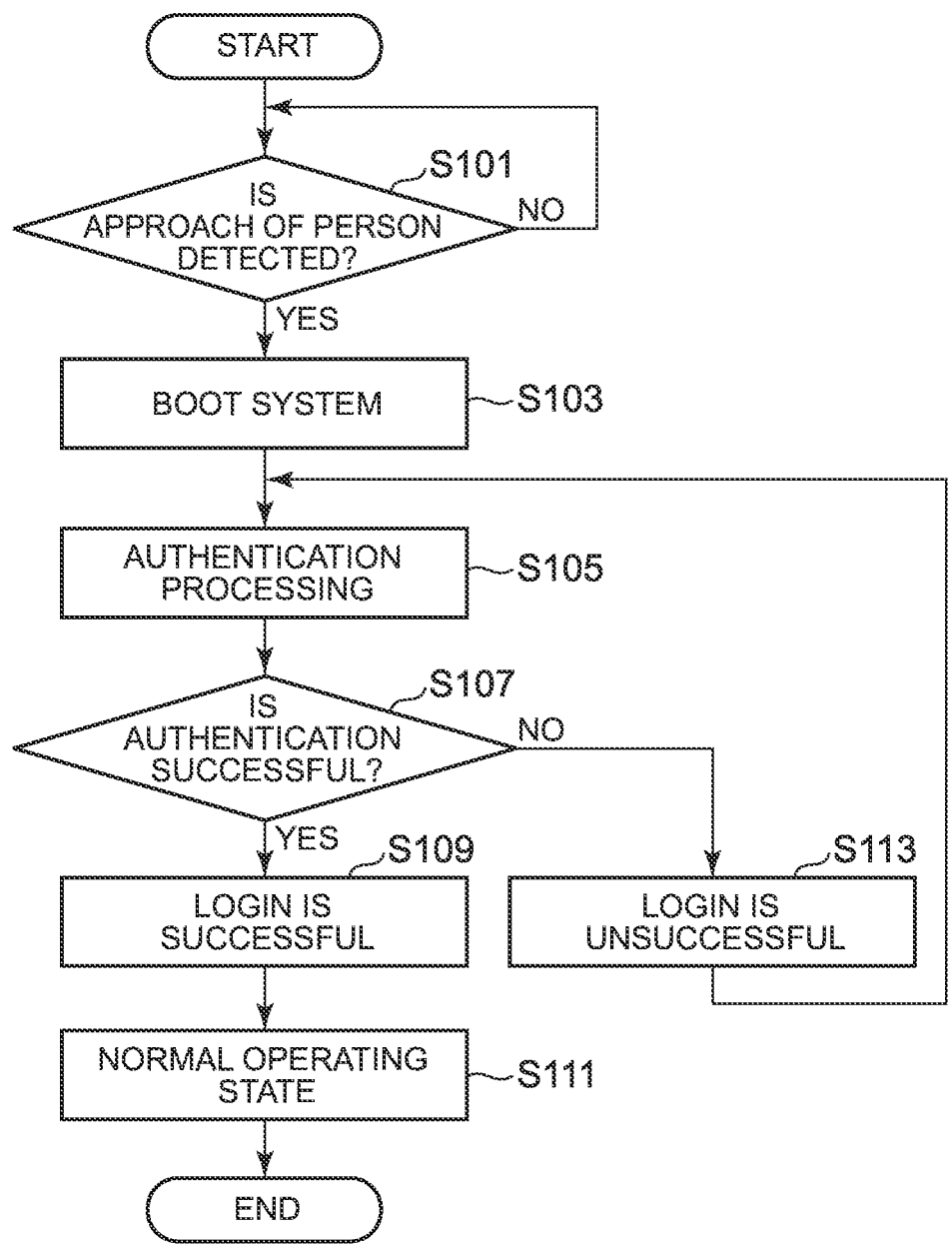
FIG. 9 is a flowchart illustrating an example of boot control according to the first embodiment.

FIG. 9 is a flowchart illustrating an example of boot control according to the embodiment. Here, it is assumed that the electronic apparatus 1 is placed open on a desk or the like in the standby state.

(Step S101) Based on a detection signal acquired from the proximity sensor 130, the EC 200 determines whether the approach of a person to the electronic apparatus 1 is detected. When a person is detected after no person is detected within the person detection range, the EC 200 determines that the approach of a person to the electronic apparatus 1 is detected. When no person remains detected within the person detection range, the EC 200 determines that the approach of a person to the electronic apparatus 1 is not detected. Then, when determining that the approach of a person to the electronic apparatus 1 is not detected (NO), the EC 200 performs processing in step S101 again. On the other hand, when determining that the approach of a person to the electronic apparatus 1 is detected (YES), the EC 200 proceeds to processing in step S103.

(Step S103) The EC 200 boots the system by the system processing unit 300. Specifically, when booting the system by the system processing unit 300, the EC 200 outputs, to the power supply unit 400, the control signal to supply power necessary for the operation of each unit of the electronic apparatus 1. Further, the EC 200 outputs the boot signal to instruct the system processing unit 300 to boot the system. When acquiring the boot signal, the system processing unit 300 starts boot processing. Then, the procedure proceeds to processing in step S105.

(Step S105) The system processing unit 300 executes login processing (authentication processing). For example, the system processing unit 300 executes the login processing by face authentication based on a captured image acquired from the imaging unit 120, and proceeds to processing in step S107.

(Step S107) The system processing unit 300 determines whether the authentication result is successful or not. When determining that the authentication result is successful (YES), the system processing unit 300 proceeds to processing in step S109. On the other hand, when determining that the authentication result is unsuccessful (NO), the system processing unit 300 proceeds to processing in step S113.

(Step S109) When the authentication result is successful, the system processing unit 300 outputs a notification that the login is successful (for example, displays the notification on the display unit 110) to continue the boot processing. Then, the procedure proceeds to processing in step S111.

(Step S111) The system processing unit 300 completes the login processing and makes a transition to the normal operating state. Here, it takes the login processing time T2 (see FIG. 2) from when the EC 200 detects the approach of a person until the login processing is completed.

(Step S113) When the authentication result is unsuccessful, the system processing unit 300 outputs a notification that the login is unsuccessful (for example, displays the notification on the display unit 110), and returns to the authentication processing in step S105. When the authentication processing is unsuccessful continuously a predetermined number of times, the system processing unit 300 may stop the authentication processing and make a transition to a state of disabling the login.

Next, the operation of standby state transition processing to cause the system to make a transition from the normal operating state to the standby state when the EC 200 detects leaving of a person from the electronic apparatus 1 will be described.

Figure 10:
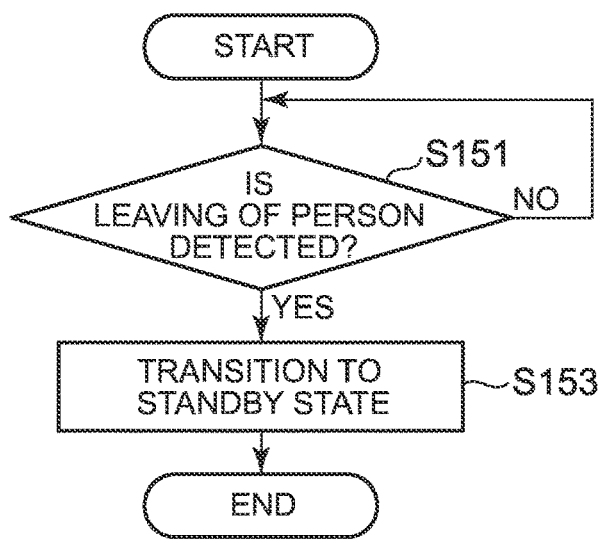
FIG. 10 is a flowchart illustrating an example of standby state transition processing according to the first embodiment.

FIG. 10 is a flowchart illustrating an example of standby state transition processing according to the embodiment. Here, it is assumed that the electronic apparatus 1 is placed on the desk or the like in the open state and the operating state thereof is the normal operating state.

(Step S151) Based on the detection signal acquired from the proximity sensor 130, the EC 200 determines whether leaving of a person from the electronic apparatus 1 is detected or not. Here, as described above, the EC 200 spends the detection time T1 (see FIG. 2) in detecting leaving of a person. For example, when no longer detecting a person after the person is detected within the person detection range, the EC 200 determines that leaving of the person from the electronic apparatus 1 is detected. On the other hand, when the person remains detected within the person detection range, the EC 200 determines that leaving of the person from the electronic apparatus 1 is not detected. Then, when leaving of the person from the electronic apparatus 1 is not detected (NO), the EC 200 performs processing in step S151 again. On the other hand, when leaving of the person from the electronic apparatus 1 is detected (YES), the EC 200 proceeds to processing in step S153.

(Step S153) The EC 200 makes a transition of the system by the system processing unit 300 from the normal operating state to the standby state. Specifically, the EC 200 outputs a standby signal to instruct the system processing unit 300 to cause the system to make a transition to the standby state. When acquiring the standby signal, the system processing unit 300 makes a transition from the normal operating state to the standby state. Further, the EC 200 outputs, to the power supply unit 400, a control signal to stop the supply of power unnecessary in the standby state.

[Operation of Playback Control Processing by HPD Processing]

Next, the operation of playback control processing for controlling the stop and resume of a video being played back by the HPD processing will be described. First, the operation of measurement processing for leaving detection time to measure the detection time T1 when the EC 200 detects leaving of a person will be described.

Figure 11:
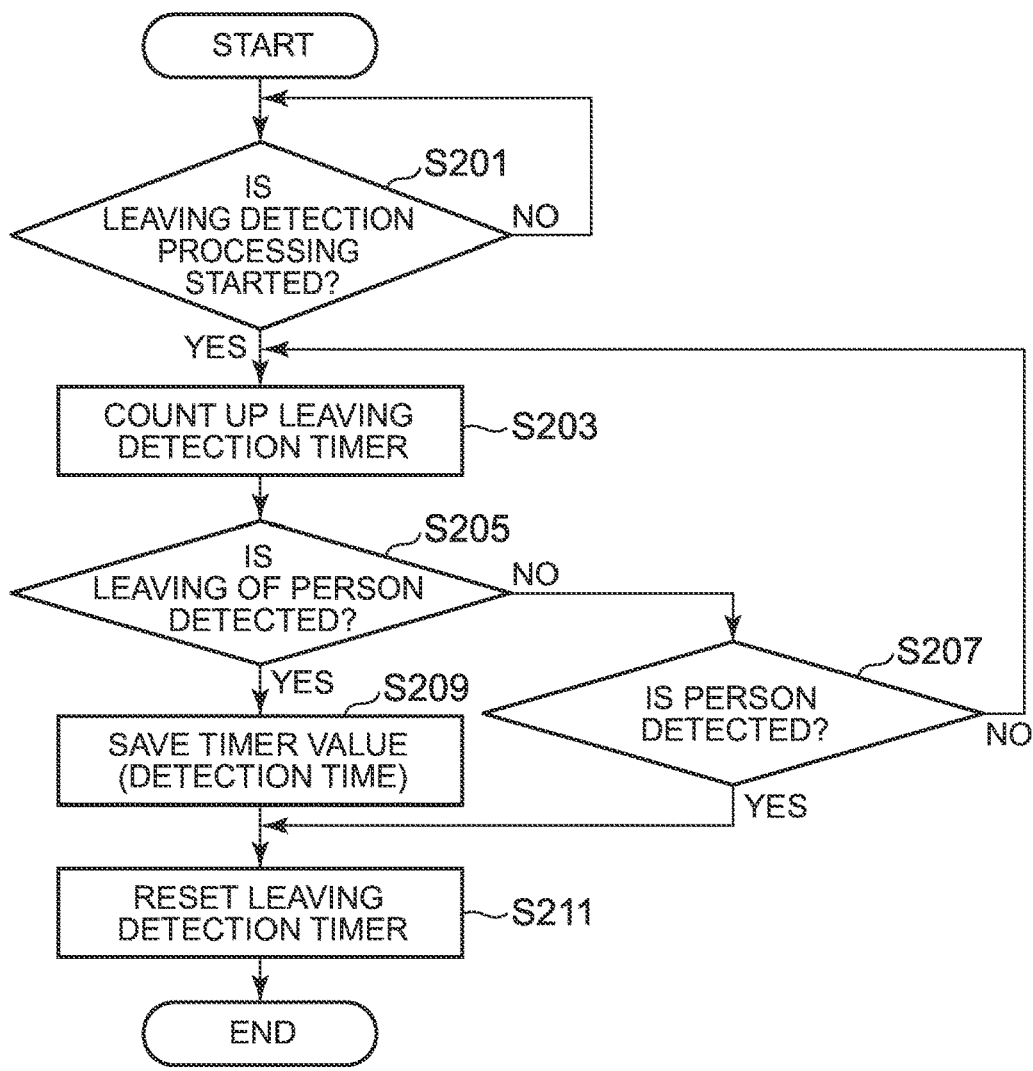
FIG. 11 is a flowchart illustrating an example of leaving detection time measuring processing according to the first embodiment.

FIG. 11 is a flowchart illustrating an example of leaving detection time measuring processing according to the embodiment. Here, it is assumed that the electronic apparatus 1 is in the normal operating state.

(Step S201) Based on the detection signal acquired from the proximity sensor 130, the EC 200 determines whether leaving detection processing to detect leaving a person is started or not. When determining that the leaving detection processing is started (YES), the EC 200 proceeds to processing in step S203. On the other hand, when determining that the leaving detection processing is not started (NO), the EC 200 repeats processing in step S201.

(Step S203) The EC 200 starts counting up the leaving detection timer at the timing of starting the leaving detection processing to measure the detection time T1 (see FIG. 2). Here, the timing of starting the leaving detection processing corresponds to the timing of time t10 in FIG. 2. Then, the procedure proceeds to processing in step S205.

(Step S205) The EC 200 determines whether leaving of a person is detected or not. When determining that leaving of the person is not detected (NO), the EC 200 proceeds to processing in step S207. On the other hand, when determining that leaving of the person is detected (YES), the EC 200 proceeds to processing in step S209.

(Step S207) When a person (presence or approach of a person) is detected within the person detection range based on the detection signal acquired from the proximity sensor 130 (YES), the EC 200 determines that the person is not left, and proceeds to processing in step S211. On the other hand, when no person is detected within the person detection range (NO), the EC 200 returns to processing in step S203 to continue to count up the leaving detection timer.

(Step S209) The EC 200 stops counting of the leaving detection timer at the timing when leaving of the person is detected and stores the timer value (detection time T1). Here, the timing when leaving of the person is detected corresponds to the timing of time t15 in FIG. 2.

(Step S211) The EC 200 resets the leaving detection timer and ends the leaving detection time measuring processing.

Next, the operation of login processing time measuring processing in which the EC 200 measures the login processing time T2 will be described.

Figure 12:
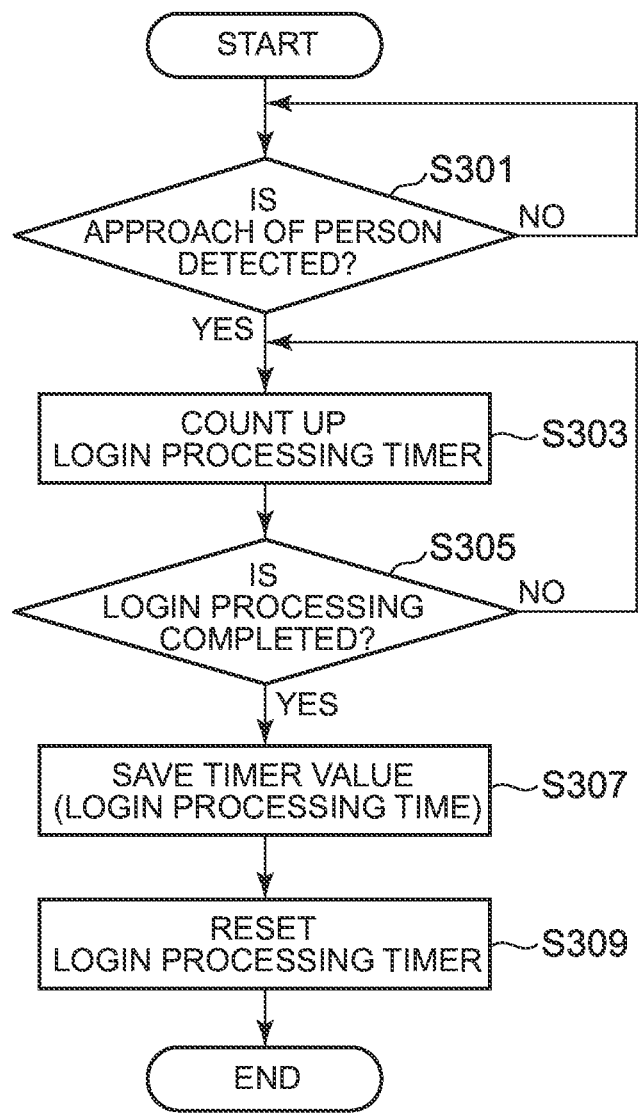
FIG. 12 is a flowchart illustrating an example of login processing time measuring processing according to the first embodiment.

FIG. 12 is a flowchart illustrating an example of login processing time measuring processing according to the embodiment. Here, it is assumed that the electronic apparatus 1 is in the standby state.

(Step S301) Based on the detection signal acquired from the proximity sensor 130, the EC 200 determines whether the approach of a person is detected or not. When determining that the approach of a person is detected (YES), the EC 200 proceeds to processing in step S303. On the other hand, when determining that the approach of a person is not detected (NO), the EC 200 repeats processing in step S301.

(Step S303) The EC 200 starts counting up the login processing timer at the timing when the approach of the person is detected to measure the login processing time T2 (see FIG. 2). Here, the timing when the approach of the person is detected corresponds to the timing of time t20 in FIG. 2. Then, the procedure proceeds to processing in step S305.

(Step S305) In the boot processing started in response to the fact that the approach of the person is detected, the EC 200 determines whether the login processing is completed or not. When determining that the login processing is not completed (NO), the EC 200 returns to processing in step S303 to continue to count up the login processing timer. On the other hand, when determining that the login processing is completed (YES), the EC 200 proceeds to processing in step S307.

(Step S307) The EC 200 stops counting of the login processing timer at the timing when the login processing is completed and stores the timer value (login processing time T2). Here, the timing when the login processing is completed corresponds to the timing of time t25 in FIG. 2. Then, the procedure proceeds to processing in step S309.

(Step S309) The EC 200 resets the login processing timer and ends the login processing time measuring processing.

Next, the operation of playback stop processing in which the EC 200 stops the video being played back when leaving of a person from the electronic apparatus 1 is detected will be described.

Figure 13:
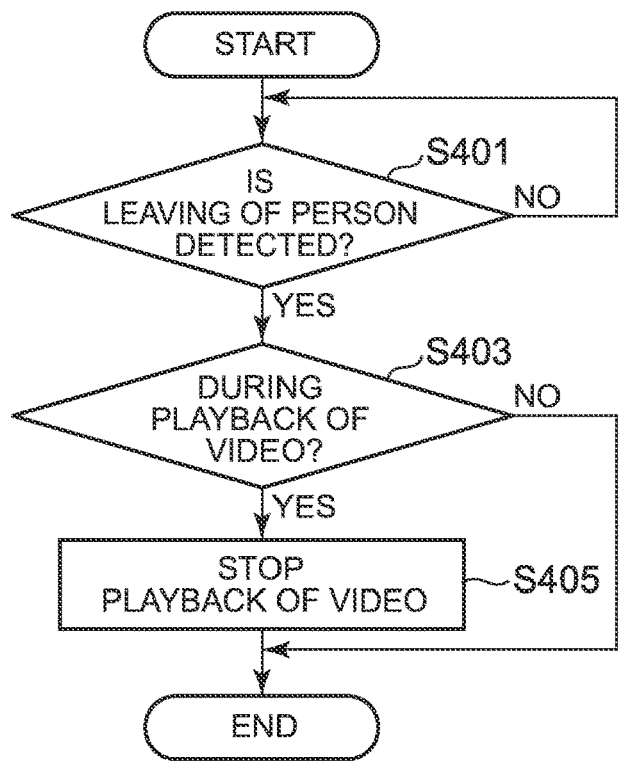
FIG. 13 is a flowchart illustrating an example of playback stop processing according to the first embodiment.

FIG. 13 is a flowchart illustrating an example of playback stop processing according to the embodiment. Here, it is assumed that the electronic apparatus 1 is in the normal operating state.

(Step S401) The EC 200 determines whether leaving of a person is detected or not. When determining that leaving of a person is not detected (NO), the EC 200 repeats processing in step S401. On the other hand, when determining that leaving of a person is detected (YES), the EC 200 proceeds to processing in step S403.

(Step S403) In the processing of the system processing unit 300 (playback processing unit 324), the EC 200 determines whether the video is being played back or not. When determining that the video is not being played back (NO), the EC 200 ends the playback stop processing without controlling the video. On the other hand, when determining that the video is being played back (YES), the EC 200 proceeds to processing in step S405.

(Step S405) The EC 200 instructs the system processing unit 300 to stop the video being played back. For example, at the last timing of the detection time T1 (see FIG. 2) when leaving of a person is detected, the EC 200 transmits, to the system processing unit 300, the "stop command" to give an instruction to stop the playback of the video before the standby signal is output to give an instruction to make a transition of the system from the normal operating state to the standby state, and ends the playback stop processing.

Next, the operation of playback resume processing in which the EC 200 resumes the playback of the video when the approach of a person to the electronic apparatus 1 is detected will be described.

Figure 14:
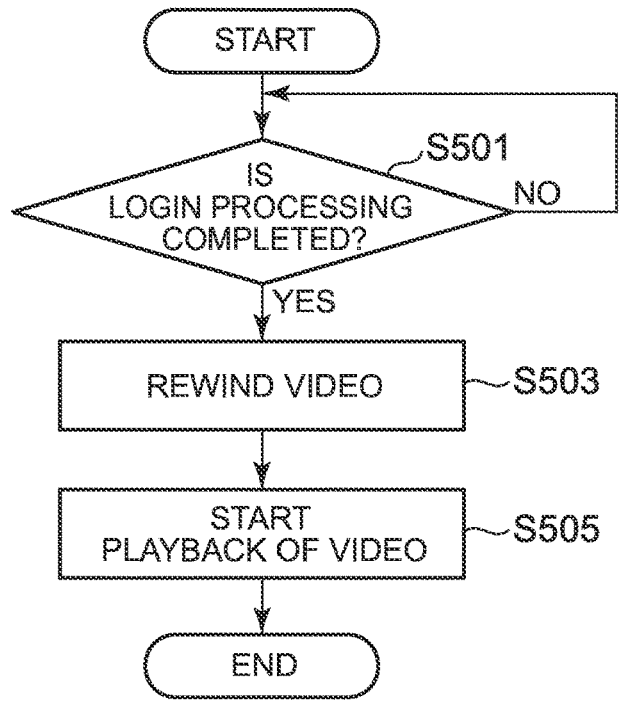
FIG. 14 is a flowchart illustrating an example of playback resume processing according to the first embodiment.

FIG. 14 is a flowchart illustrating an example of playback resume processing according to the embodiment. Here, it is assumed that the electronic apparatus 1 is booted from the standby state and the login processing is executed.

(Step S501) The EC 200 determines whether the login processing is completed or not. When determining that the login processing is not completed (NO), the EC 200 repeats processing in step S501. On the other hand, when determining that the login processing is completed (YES), the EC 200 proceeds to processing in step S503.

(Step S503) The EC 200 transmits, to the system processing unit 300, the "rewind command" to give an instruction to cause the playback position of the video to go back. Then, the procedure proceeds to processing in step S505.

(Step S505) The EC 200 transmits, to the system processing unit 300, the "playback command" to give an instruction to start (resume) playback at the timing when a given length of time has passed after the transmission of the "rewind command." The given length of time mentioned above is the time necessary for rewinding the video by a length of time played back during the detection time T1 and the login processing time T2. Specifically, based on the measured value (timer value) of the detection time T1 stored in step S209 of FIG. 11 and the measured value (timer value) of the login processing time T2 stored in step S307 of FIG. 12, the EC 200 calculates the time necessary for rewinding the video by the length of time played back during the detection time T1 and the login processing time T2. Then, the EC 200 transmits the "playback command" at the timing when the above calculated time has passed after the transmission of the "rewind command" in step S503. Then, the playback resume processing is ended.

Note that the EC 200 may start (resume) playback of the video from a playback position rewound by a playback time obtained by adding a predetermined time to the length of time played back during the detection time T1 and the login processing time T2. Further, the EC 200 may transmit the "stop command" to the system processing unit 300 before transmitting the "rewind command" in step S503 or before transmitting the "playback command" in step S505.

Summary of First Embodiment

As described above, the electronic apparatus 1 according to the embodiment includes the system processing unit 300, the playback processing unit 324, the person detection unit 210, the operation control unit 220, and the playback control unit 230. The system processing unit 300 executes system processing based on the system (for example, the OS). The playback processing unit 324 executes video playback processing in the system processing. The person detection unit 210 spends the detection time T1 (an example of a first period) in detecting a change from a first detection state in which a person is present within the person detection range (an example of a predetermined detection range) to a second detection state in which no person is present (that is, leaving of the person from the electronic apparatus 1 (Leave)). When the change from the first detection state to the second detection state is detected by the person detection unit 210, the operation control unit 220 instructs the system processing unit 300 to cause the operating state of the system to make a transition to the standby state (an example of a first operating state) in which at least part of system processing is limited, and based on the fact that a predetermined condition is satisfied, the operation control unit 220 instructs the system processing unit 300 to activate (boot) the operating state of the system from the standby state. Here, the predetermined condition is to detect approach of a person to the electronic apparatus 1, accept user's input (for example, an operation to the input device 150) in order to activate (boot) the system, or the like. When the video is being played back at the first timing of the detection time T1, the playback control unit 230 instructs the playback processing unit 324 to start the playback of the video with reference to the playback position at the first timing of the detection time T1 in response to the fact that the operating state of the system is activated (booted) from the standby state.

Thus, when the user comes back again after leaving during playback of the video, the electronic apparatus 1 can resume playback from a playback position as the continuation of a part where the user had watched before leaving. Therefore, the user who has come back is not required to perform an operation to rewind the video so as to search for the playback position when watching where the user left off, allowing the user to continue to watch the video from the continued part where the user had watched before leaving. Thus, the electronic apparatus 1 can control the playback of the video properly according to the presence or absence of a person.

Further, the playback control unit 230 instructs the playback processing unit 324 to stop the video being played back according to the last timing of the detection time T1 (the example of the first period).

Thus, when leaving of the user is detected during playback of the video, since the video being played back is stopped, the electronic apparatus 1 can control the playback of the video properly according to the presence or absence of a person.

Further, the playback control unit 230 sets, as a playback position at the first timing of the detection time T1, a playback position obtained by rewinding the video by a length of time corresponding to a part of the video played back during at least the detection time T1 (the example of the first period), and instructs the playback processing unit 324 to start the playback of the video with reference to the playback position.

Thus, when the user comes back again after leaving during playback of the video, the electronic apparatus 1 can play back the video from the playback position obtained by rewinding the video by a length of time corresponding to a part of the video played back during a period from when the user left until leaving is detected.

Further, the system processing unit 300 executes login processing based on the instruction from the operation control unit 220 to activate (boot) the operating state of the system from the standby state (the example of the first operating state). According to the timing when the login processing is completed, the playback control unit 230 instructs the playback processing unit 324 to start the playback of the video with reference to the playback position at the first timing of the detection time T1 (the example of the first period).

Thus, when the user comes back again after leaving during playback of the video, the electronic apparatus 1 can resume the playback of the video from the playback position as the continuation of a part where the user had watched before leaving after the login processing is completed to make a transition to the operating state where the user can watch the video.

The person detection unit 210 further detects a change from the second detection state in which no person is present within the person detection range (the example of the predetermined detection range) to the first detection state in which a person is present (that is, approach of a person to the electronic apparatus 1 (Approach)). Then, when the change from the second detection state to the first detection state is detected by the person detection unit 210, the operation control unit 220 determines that a predetermined condition is satisfied and instructs the system processing unit 300 to activate (boot) the operating state of the system from the standby state (the example of the first operating state).

Thus, when the user comes back again, the electronic apparatus 1 can detect that the user comes back and automatically boot the system the operating state of which was transited to the standby state when the user once left during playback of the video.

Further, when giving the instruction to start the playback of the video according to the timing when the login processing is completed, the playback control unit 230 sets, as the playback position at the first timing of the detection time T1, a playback position obtained by rewinding the video by a length of time corresponding to a part of the video played back during the login processing time T2 (an example of a second period) from when the change from the second detection state, in which no person is present within the person detection range (the example of the predetermined detection range), to the first detection state in which a person is present (that is, approach of a person to the electronic apparatus 1 (Approach)) is detected until the login processing is completed, and during the detection time T1 (the example of the first period). Then, the playback control unit 230 instructs the playback processing unit 324 to start the playback of the video with reference to the playback position.

Thus, when the user comes back again after leaving during playback of the video, the electronic apparatus 1 can play back the video from the playback position obtained by rewinding the video by a length of time corresponding to a part of the video played back during a period from when the user left until leaving is detected and by a length of time corresponding to a part of the video played back during the login processing.

Further, the playback control unit 230 instructs the playback processing unit 324 to start the playback of the video from a playback position further rewound by a predetermined length of time (for example, ten seconds, one minute, or the like) from the playback position at the first timing of the detection time T1 (the example of the first period). For example, the playback control unit 230 may give an instruction to start the playback of the video from a playback position further rewound by a predetermined length of time (for example, ten seconds, one minute, or the like) from the playback position obtained by rewinding the video by a length of time corresponding to a part of the video played back during the detection time T1 and the login processing time T2.

Thus, when the user comes back again after leaving during playback of the video, the electronic apparatus 1 can resume the playback of the video from a playback position shortly before the playback position corresponding to a part where the user had watched before leaving. Therefore, the user can watch the continued part of the video while easily remembering the content of the video watched before leaving.

Further, based on the detection result of the distance to an object present within the person detection range (the example of the predetermined detection range), the person detection unit 210 detects whether a person is present within the person detection range or not.

Thus, the electronic apparatus 1 can detect the distance to a person to detect the presence or absence of the user with a simple configuration and at a low load.

Further, based on the detection result of the distance to an object present within the person detection range (the example of the predetermined detection range), the person detection unit 210 spends the detection time T1 (the example of the first period) in detecting a distance variation generated according to the cycle of breathing of a person present within the person detection range to detect whether a person is present within the person detection range or not.

Thus, the electronic apparatus 1 can detect a person in distinction from any object other than the person, and hence the detection accuracy of the presence or absence of a person can be improved.

In the embodiment, when the user comes back again after leaving during playback of the video, the electronic apparatus 1 resumes the playback of the video after rewinding the video by a playback time during the detection time T1 and by a playback time during the login processing time T2. However, when the video is not played back during the login processing time T2 (or when the time of being played back is short), the electronic apparatus 1 may resume the playback of the video after rewinding the video by a playback time during the detection time T1 alone. Further, the electronic apparatus 1 may give an instruction to start the playback of the video from a playback position further rewound by a predetermined length of time (for example, ten seconds, one minute, or the like) from the playback position obtained by rewinding the video by a length of time corresponding to a part of the video played back during the detection time T1.

Further, the electronic apparatus 1 may store the playback position at the first timing (time t10 in FIG. 2) of the detection time T1 to start the playback of the video from the stored playback position according to the timing when the login processing is completed. In this case, since the playback position at which playback is started is stored, the electronic apparatus 1 does not have to measure the detection time T1, measure the login processing time T2, perform control to stop the playback of the video according to the timing when leaving of a person is detected, and the like.

Second Embodiment

Next, a second embodiment of the present invention will be described.

In this embodiment, a specific example of control for stopping a video being played back and making a transition to the standby state when the electronic apparatus 1 detects leaving of a person will be described. When detecting leaving of a person during playback of a video, the electronic apparatus 1 prohibits the transition to the standby state and stops the playback of the video. Further, after confirming that the playback of the video is stopped, the electronic apparatus 1 cancels the prohibition on the transition to the standby state and makes the transition to the standby state. Since the basic structure/configuration of the electronic apparatus 1 according to the embodiment is the same as the structure/configuration illustrated in FIG. 3 and FIG. 5, the description thereof will be omitted appropriately. Here, characteristic component and processing according to the embodiment will be described.

Figure 15:
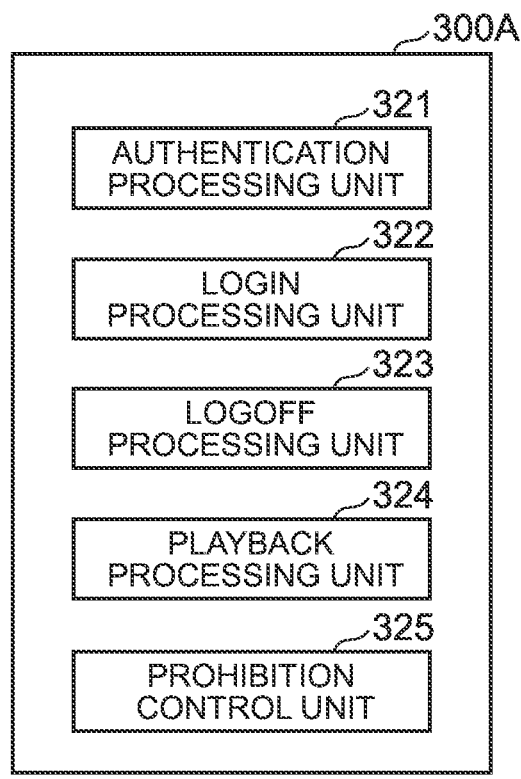
FIG. 15 is a schematic block diagram illustrating a functional configuration example of a system processing unit according to a second embodiment.

FIG. 15 is a schematic block diagram illustrating an example of the functional configuration of a system processing unit 300A according to the embodiment. FIG. 15 is a diagram illustrating an example of the functional configuration implemented by the system processing unit 300 illustrated in FIG. 5, and components corresponding to respective units illustrated in FIG. 8 are given the same reference numerals to omit redundant description. The system processing unit 300A includes the authentication processing unit 321, the login processing unit 322, the logoff processing unit 323, the playback processing unit 324, and a prohibition control unit 325. The basic configuration of the login processing unit 322, the logoff processing unit 323, and the playback processing unit 324 is the same as that of the first embodiment.

When leaving of a person is detected by the person detection unit 210, the prohibition control unit 325 instructs the operation control unit 220 to prohibit a transition to the standby state. For example, the prohibition control unit 325 issues a sleep prohibition signal indicating that the transition to the standby state is prohibited, and transmits the sleep prohibition signal to the operation control unit 220. When receiving this sleep prohibition signal, the operation control unit 220 withholds the standby signal for giving an instruction to make the transition to the standby state, rather than outputting the standby signal. Further, when receiving this sleep prohibition signal, the playback control unit 230 transmits, to the system processing unit 300, the "stop command" to give an instruction to stop the playback of the video.

Further, based on a processing state of specific processing executed on the OS, the prohibition control unit 325 cancels the prohibition on the transition to the standby state. For example, under such a condition that the playback of the video is in a stopped state (i.e., that a change from a state of being played back to the stopped state is made), the prohibition control unit 325 transmits, to the operation control unit 220, a sleep prohibition cancel signal to cancel the prohibition on the transition to the standby state. When receiving this sleep prohibition cancel signal, the operation control unit 220 transmits, to the system processing unit 300, a standby signal to give an instruction to make the transition to the standby state.

Here, the sleep prohibition signal and the sleep prohibition cancel signal are, for example, flag information indicating whether to prohibit the transition to the standby state or not. The sleep prohibition signal is a signal including data of "1" to indicate that the transition to the standby state is prohibited, and the sleep prohibition cancel signal is a signal including data of "0" to indicate that the transition to the standby state is not prohibited (the prohibition is canceled).

Further, when leaving of the person is detected by the person detection unit 210, the operation control unit 220 may first control the display screen of the display unit 110 to be screen lock or screen OFF, and then, when the prohibition on the transition to the standby state is canceled by the prohibition control unit 325, the operation control unit 220 may output the standby signal to give an instruction to make the transition to the standby state. Note that the screen OFF may be a state in which no display is provided on the display unit 110 or may be a state in which a black image (or a gray image) is displayed on the display unit 110. Further, a black image (or a gray image) may be displayed only on part of the screen (for example, about 80% of the screen, or the like) rather than full screen OFF. In other words, when leaving of the person is detected by the person detection unit 210, the operation control unit 220 may first control the display screen in such a manner that at least part of the display image to be displayed on the display unit 110 will be made invisible. For example, when the display screen of the display unit 110 is controlled to be screen lock or screen OFF, the operation control unit 220 transmits, to the system processing unit 300, a control signal for making a transition to the screen lock or the screen OFF. When receiving the control signal, the system processing unit 300 controls the display screen of the display unit 110 to be screen lock or screen OFF.

Note that this state of screen lock or screen OFF is a state in which at least video playback processing by the playback processing unit 324 is executable in the background. In other words, control of the display screen to be screen lock or screen OFF is control to make it appear to the user as though the transition to the standby state (for example, sleep) were made even when it takes time to cancel the prohibition on the transition to the standby state based on the processing state of the specific processing after leaving of the person is detected.

Figure 16:
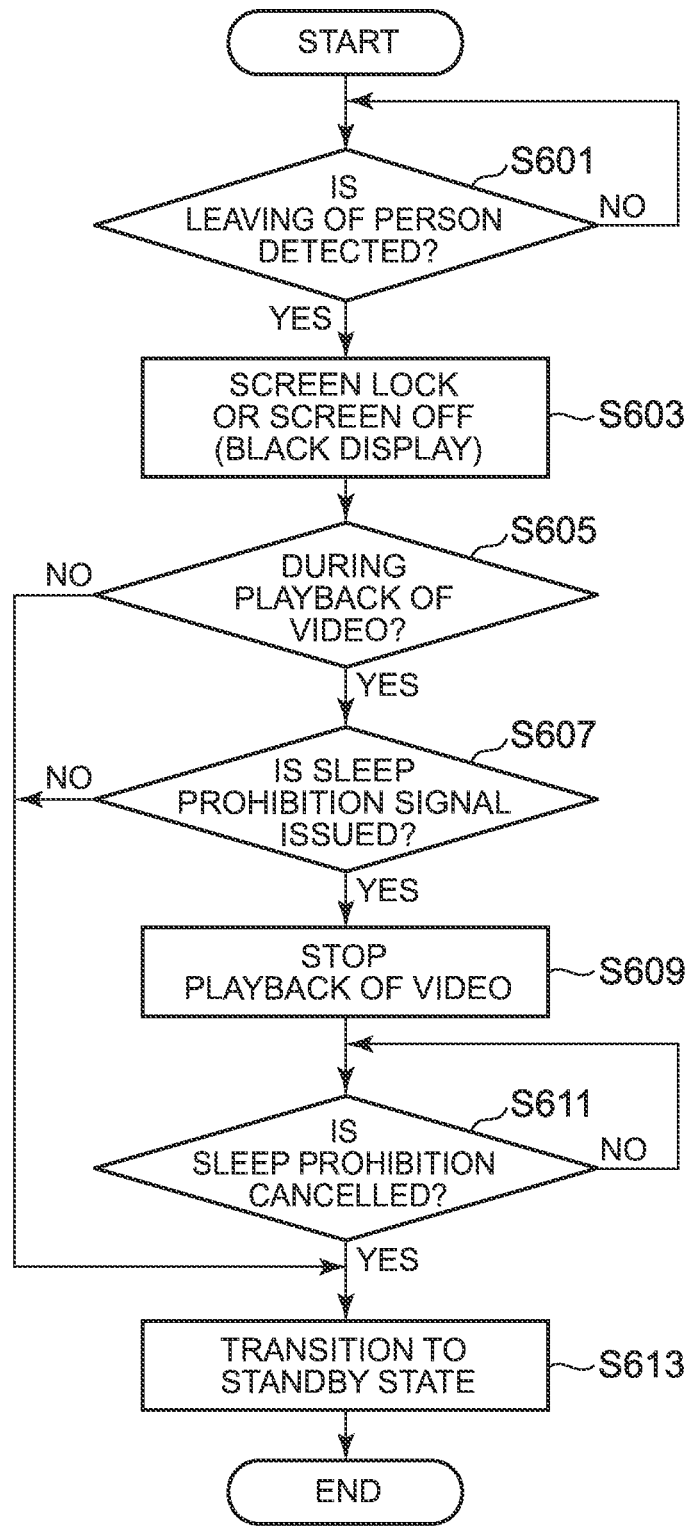
FIG. 16 is a flowchart illustrating an example of standby state transition processing according to the second embodiment.

Referring next to FIG. 16, the operation of standby state transition processing for making the transition to the standby state after stopping the playback of a video in the case where the video is being played back when leaving of a person from the electronic apparatus 1 is detected will be described. FIG. 16 is a flowchart illustrating an example of standby state transition processing according to the embodiment.

(Step S601) Based on the detection signal acquired from the proximity sensor 130, the EC 200 determines whether leaving of a person from the electronic apparatus 1 is detected or not. For example, when no longer detecting a person after the person is detected within the person detection range, the EC 200 determines that leaving of the person from the electronic apparatus 1 is detected. On the other hand, when the person remains detected within the person detection range, the EC 200 determines that leaving of the person from the electronic apparatus 1 is not detected. When leaving of the person from the electronic apparatus 1 is not detected (NO), the EC 200 performs processing in step S601 again. On the other hand, when leaving of the person from the electronic apparatus 1 is detected (YES), the EC 200 proceeds to processing in step S603.

(Step S603) The EC 200 controls the display screen of the display unit 110 to be screen lock or screen OFF. For example, the EC 200 transmits, to the system processing unit 300, a control signal to make a transition to screen lock or screen OFF. Then, EC 200 proceeds to processing in step S605.

(Step S605) In the processing of the system processing unit 300 (playback processing unit 324), the EC 200 determines whether the video is being played back or not. When determining that the video is not being played back (NO), the EC 200 proceeds to processing in step S613. On the other hand, when determining that the video is being played back (YES), the EC 200 proceeds to processing in step S607.

(Step S607) The EC 200 determines whether the sleep prohibition signal is issued or not (whether the transition to the standby state is prohibited or not). For example, when acquiring no sleep prohibition signal from the system processing unit 300, the EC 200 determines that the sleep prohibition signal is not issued, while when acquiring the sleep prohibition signal, the EC 200 determines that the sleep prohibition signal is issued. When determining that the sleep prohibition signal is not issued (NO), the EC 200 proceeds to processing in step S613. On the other hand, when determining that the sleep prohibition signal is issued (YES), the EC 200 proceeds to processing in step S609.

(Step S609) The EC 200 gives an instruction to stop the video being played back. For example, the EC 200 transmits, to the system processing unit 300, the "stop command" to give an instruction to stop the playback of the video. Then, the EC 200 proceeds to processing in step S611.

(Step S611) The EC 200 determines whether sleep prohibition is canceled or not (whether prohibition on the transition to the standby state is canceled or not). For example, when acquiring no sleep prohibition cancel signal from the system processing unit 300, the EC 200 determines that sleep prohibition is not canceled, while when acquiring the sleep prohibition cancel signal, the EC 200 determines that sleep prohibition is canceled. When determining that sleep prohibition is not canceled (NO), the EC 200 repeats processing in step S611. On the other hand, when determining that sleep prohibition is canceled (YES), the EC 200 proceeds to processing in step S613.

(Step S613) When receiving the sleep prohibition cancel signal, the EC 200 transmits, to the system processing unit 300, the standby signal to give an instruction to make the transition to the standby state. Thus, the system processing unit 300 causes the system to make a transition from the normal operating state to the standby state (for example, sleep).

Note that the EC 200 may execute processing in step S607 following processing in step S603 without performing processing in step S605. In other words, the EC 200 may determine whether the sleep prohibition signal is issued or not (whether the transition to the standby state is prohibited or not) regardless of whether the video is being played back or not.

Summary of Second Embodiment

As described above, the electronic apparatus 1 according to the embodiment includes the system processing unit 300, the person detection unit 210, the operation control unit 220, and the prohibition control unit 325. The system processing unit 300 executes system processing based on the system (for example, the OS). The person detection unit 210 detects a change from the first detection state in which a person is present within the person detection range (the example of the predetermined detection range) to the second detection state in which no person is present (that is, leaving of the person from the electronic apparatus 1 (Leave)). When the change from the first detection state to the second detection state is detected by the person detection unit 210, the operation control unit 220 instructs the system processing unit 300 to cause the operating state of the system to make a transition to the standby state (the example of the first operating state) in which at least part of system processing is limited. When the change from the first detection state to the second detection state is detected by the person detection unit 210, the prohibition control unit 325 instructs the operation control unit 220 to prohibit the transition to the standby state, and cancels the prohibition on the transition to the standby state based on a processing state of specific processing executed in the system processing.

For example, the electronic apparatus 1 includes the playback processing unit 324 and the playback control unit 230. The playback processing unit 324 executes video playback processing as the specific processing executed in the system processing. When the change from the first detection state to the second detection state is detected by the person detection unit 210 and prohibition on the transition to the standby state (the example of the first operating state) is instructed by the prohibition control unit 325, the playback control unit 230 instructs the playback processing unit 324 to stop the playback of the video. Then, under such a condition that the playback of the video is in a stopped state as the processing state of the video playback processing by the playback processing unit 324, the prohibition control unit 325 cancels the prohibition on the transition to the standby state.

Thus, when the user has left during playback of the video, the electronic apparatus 1 can cause the system to make the transition to the standby state (for example, sleep) after stopping the video being played back. Therefore, the electronic apparatus 1 can control the operating state properly according to the presence or absence of a person.

Specifically, in the case where the change from the first detection state to the second detection state (that is, leaving of the person from the electronic apparatus 1 (Leave)) is detected by the person detection unit 210, when playback processing (an example of specific processing) is during playback (an example of a first processing state), the prohibition control unit 325 instructs the operation control unit 220 to prohibit the transition to the standby state (the example of the first operating state). Further, under such a condition that the playback processing (the example of the specific processing) is changed from during playback to the stopped state (a second processing state), the prohibition control unit 325 cancels the prohibition on the transition to the standby state.

Thus, the electronic apparatus 1 can stop the video being played back only when the video is being played back and cause the system to make the transition to the standby state (for example, sleep) after stopping the video. Note that the electronic apparatus 1 may once prohibit the transition to the standby state (the example of the first operating state) regardless of whether the video is being played back when leaving of the person is detected. Then, the electronic apparatus 1 may cancel the prohibition on the transition to the standby state based on the fact that the video is in the stopped state.

Further, when the change from the first detection state to the second detection state (that is, leaving of the person from the electronic apparatus 1 (Leave)) is detected by the person detection unit 210, the operation control unit 220 controls the display screen in such a manner that at least part of the display image to be displayed on the display unit 110 will be made invisible. After that, when the prohibition on the transition to the standby state (the example of the first operating state) is canceled by the prohibition control unit 325, the operation control unit 220 instructs the system processing unit 300 to make the transition to the standby state.

Thus, even when it takes time to cancel the prohibition on the transition to the standby state after the transition to the standby state is prohibited in response to the fact that leaving of the person is detected, since it appears to the user as though the transition to the standby state (for example, sleep) were made immediately, the electronic apparatus 1 can not only prevent the user from having anxiety about control failure, but also enhance safety such as security or privacy protection.

In the embodiment, the example of making the transition to the standby state after the video being played back is stopped is described, but the specific processing performed before the transition to the standby state may also be any other processing. For example, the specific processing performed before the transition to the standby state may be mail sending processing, file download or upload processing, file save processing, or the like.

Specifically, when the change from the first detection state to the second detection state is detected by the person detection unit 210, the prohibition control unit 325 may instruct the operation control unit 220 to prohibit the transition to the standby state, and cancel the prohibition on the transition to the standby state under such a condition that mail sending is completed in mail sending processing (an example of specific processing) (that is, a state in which mail is not being sent). For example, in the case where the change from the first detection state to the second detection state (that is, leaving of the person from the electronic apparatus 1 (Leave)) is detected by the person detection unit 210, when mail is being sent (an example of the first processing state) in the mail sending processing (the example of specific processing), the prohibition control unit 325 may instruct the operation control unit 220 to prohibit the transition to the standby state (the example of the first operating state). Further, the prohibition control unit 325 may cancel the prohibition on the transition to the standby state under such a condition that the mail sending processing (the example of specific processing) changes from the state in which mail is being sent to the state in which mail sending is completed (a second processing state). Thus, when leaving of the person from the electronic apparatus 1 is detected, since the transition to the standby state is made after completion of sending the mail being sent, the electronic apparatus 1 can prevent the sent mail from not being sent even if the user leaves the electronic apparatus 1 soon after sending the mail.

Further, when the change from the first detection state to the second detection state is detected by the person detection unit 210, the prohibition control unit 325 may instruct the operation control unit 220 to prohibit the transition to the standby state, and cancel the prohibition on the transition to the standby state under such a condition that download or upload is completed in file download or upload processing (an example of specific processing) (that is, a state in which a file is not being downloaded or uploaded). For example, in the case where the change from the first detection state to the second detection state (that is, leaving of the person from the electronic apparatus 1 (Leave)) is detected by the person detection unit 210, when the file is being downloaded or uploaded (an example of the first processing state) in file download or upload processing (an example of specific processing), the prohibition control unit 325 may instruct the operation control unit 220 to prohibit the transition to the standby state (the example of the first operating state). Further, the prohibition control unit 325 may cancel the prohibition on the transition to the standby state under such a condition that the file download or upload processing (the example of the specific processing) is changed from a state during downloading or uploading to a state in which the download or upload is completed (a second processing state). Thus, when leaving of the person from the electronic apparatus 1 is detected, since the transition to the standby state is made after completion of downloading or uploading the file being downloaded or uploaded, the electronic apparatus 1 can prevent the file, which should have been downloaded or uploaded, from not being downloaded or uploaded even if the user leaves the electronic apparatus 1 in the middle of downloading or uploading on the electronic apparatus 1.

Further, when the change from the first detection state to the second detection state is detected by the person detection unit 210, the prohibition control unit 325 may instruct the operation control unit 220 to prohibit the transition to the standby state, and cancel the prohibition on the transition to the standby state under such a condition that saving of a file in file save processing (an example of specific processing) is completed (that is, a state in which the file is not being saved). For example, in the case where the change from the first detection state to the second detection state (that is, leaving of the person from the electronic apparatus 1 (Leave)) is detected by the person detection unit 210, when the file save processing (the example of specific processing) is in a state during saving the file (an example of the first processing state), the prohibition control unit 325 may instruct the operation control unit 220 to prohibit the transition to the standby state (the example of the first operating state). Further, the prohibition control unit 325 may cancel the prohibition on the transition to the standby state under such a condition that the file save processing (the example of the specific processing) is changed from a state during saving the file to a state in which saving of the file is completed (a second processing state). Thus, when leaving of the person from the electronic apparatus 1 is detected, since the transition to the standby state is made after completion of saving the file, the electronic apparatus 1 can prevent the file, which should have been saved, from not being saved even if the user leaves the electronic apparatus 1 soon after performing the file saving operation.

While the first and second embodiments of this invention have been described in detail above with reference to the accompanying drawings, the specific configurations are not limited to those in the above-described embodiments, and design changes and the like are included without departing from the scope of this invention. For example, the respective configurations described in the above-described respective embodiments can be combined arbitrarily.

Further, in the aforementioned embodiments, the example in which the person detection unit 210 detects a person (more specifically, an object estimated to be a person) present within the person detection range based on the detection signal (that is, the distance to the object) acquired from the proximity sensor 130 has been described, but the person detection method is not limited thereto. For example, the person detection unit 210 may detect a person or the face of the person from a captured image acquired by the imaging unit 120 to detect the person present within the person detection range.

Further, in the aforementioned embodiments, the configuration example in which the imaging unit 120 is incorporated in the electronic apparatus 1 has been described, but the configuration is not limited thereto. For example, the imaging unit 120 does not have to be incorporated in the electronic apparatus 1, which may also be connected to the electronic apparatus 1 wirelessly or by wire as an external accessory.

Further, in the aforementioned embodiments, the EC 200 configured to operate independently of the system processing unit 300 may be any processing unit such as a sensor hub or a chipset, or the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300.

Further, in the standby state described above, a hibernation state, a power-off state, or the like may also be included. The hibernation state corresponds, for example, to S4 state defined in the ACPI specification. The power-off state corresponds, for example, to S5 state (shutdown state) defined in the ACPI specification.

Note that the electronic apparatus 1 described above has a computer system therein. Then, a program for implementing the function of each component included in the electronic apparatus 1 described above may be recorded on a computer-readable recording medium so that the program recorded on this recording medium will be read into the computer system and executed to perform processing in each component included in the electronic apparatus 1 described above. Here, the fact that "the program recorded on the recording medium is read into the computer system and executed" includes installing the program on the computer system. Here, it is assumed that the "computer system" includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can be applied to a household electric appliance or a commercial electric appliance. As the household electric appliance, the present invention can be applied to a TV set capable of playing back a video recorded as a streaming video or a video file. For example, ON/OFF control of the TV screen and playback control of the video can be performed according to the approach or leaving of a person. Further, as the household electric appliance, the present invention may be applied to a refrigerator, a microwave oven, or the like, provided with a display unit capable of playing back a video recorded as a streaming video or a video file (for example, a product instruction manual video, a recipe video, or the like). As the commercial electric appliance, the present invention can be applied to a multimedia station or the like provided with a display unit capable of playing back a video recorded as a streaming video or a video file. For example, ON/OFF control of the screen of the display unit of the multimedia station and playback control of the video can be performed according to the approach or leaving of a person.

The invention claimed is:

1. An electronic apparatus comprising:
a system processing unit configured to execute system processing based on a system;
a person detection unit configured to detect a change from a first detection state in which a person is present within a predetermined detection range to a second detection state in which no person is present within the predetermined detection range;
an operation control unit configured to instruct the system processing unit to cause an operating state of the system to transition to a first operating state in which at least part of the system processing is limited when the change from the first detection state to the second detection state is detected by the person detection unit;
a prohibition control unit configured to instruct the operation control unit to prohibit the transition to the first operating state when the change from the first detection state to the second detection state is detected by the person detection unit, and to cancel prohibition on the transition to the first operating state based on a processing state of a specific processing executed in the system processing; and
the prohibition control unit, after confirming without user intervention that playback of a video by the electronic apparatus has stopped, cancels prohibition on the transition to the first operating state.

2. The electronic apparatus according to claim 1, further comprising:
a playback processing unit configured to execute video playback processing as the specific processing executed in the system processing; and
a playback control unit configured to instruct the playback processing unit to stop playback of the video when the change from the first detection state to the second detection state is detected by the person detection unit and to prohibit the transition to the first operating state given by the prohibition control unit.

3. The electronic apparatus according to claim 1, wherein, when the change from the first detection state to the second detection state is detected by the person detection unit, the prohibition control unit instructs the operation control unit to prohibit the transition to the first operating state when the specific processing is in a first processing state, and cancels the prohibition on the transition to the first operating state when the specific processing is changed from the first processing state to a second processing state.

4. The electronic apparatus according to claim 1, wherein, when the change from the first detection state to the second detection state is detected by the person detection unit, the operation control unit performs control to make at least part of a display image to be displayed on a display unit invisible, and after that, when the prohibition on the transition to the first operating state is canceled by the prohibition control unit, the operation control unit instructs the system processing unit to make the transition to the first operating state.

5. A control method for an electronic apparatus including a system processing unit configured to execute system processing based on a system, the control method comprising:
a person detection step of causing a person detection unit to detect a change from a first detection state in which a person is present within a predetermined detection range to a second detection state in which no person is present within the predetermined detection range;
an operation control step of causing an operation control unit to instruct the system processing unit to cause an operating state of the system to transition to a first operating state in which at least part of the system processing is limited when the change from the first detection state to the second detection state is detected in the person detection step;
a prohibition control step of causing a prohibition control unit to instruct the operation control unit to prohibit the transition to the first operating state when the change from the first detection state to the second detection state is detected by the person detection unit, and to cancel prohibition on the transition to the first operating state based on a processing state of a specific processing executed in the system processing; and
the prohibition control step further including, after confirming without user intervention that playback of a video by the electronic apparatus has stopped, cancels prohibition on the transition to the first operating state.

6. A non-transitory computer readable medium with computer executable instructions stored thereon, executed by a processor, to perform a method to execute system processing based on a system, the method comprising:
a person detection step of detecting a change from a first detection state in which a person is present within a predetermined detection range to a second detection state in which no person is present within the predetermined detection range;
an operation control step of instructing the system processing unit to cause an operating state of the system to make a transition to a first operating state in which at least part of the system processing is limited when the change from the first detection state to the second detection state is detected in the person detection step;
a prohibition control step of giving an instruction to prohibit the transition to the first operating state when the change from the first detection state to the second detection state is detected in the person detection step, and to cancel prohibition on the transition to the first operating state based on a processing state of a specific processing executed in the system processing;
the prohibition control step further including, after confirming without user intervention that playback of a video by the electronic apparatus has stopped, cancels prohibition on the transition to the first operating state.

* * * * *